(12) United States Patent  (10) Patent No.: US 6,269,694 B2
Morimoto  (45) Date of Patent: Aug. 7, 2001

(54) FLOAT-SUPPORTED DIELECTRIC LEVEL SENSOR

(75) Inventor: Hideo Morimoto, Gojo (JP)

(73) Assignee: Nitta Corporation (JP)

( * ) Notice: Subject to any disclaimer, the term of this patent is extended or adjusted under 35 U.S.C. 154(b) by 0 days.

(21) Appl. No.: 09/752,991

(22) Filed: Jan. 2, 2001

Related U.S. Application Data

(62) Division of application No. 09/116,642, filed on Jul. 16, 1998.

(30) Foreign Application Priority Data

Jul. 16, 1997 (JP) .................................................. 9-191046
Jul. 31, 1997 (JP) .................................................. 9-205750
Aug. 20, 1997 (JP) .................................................. 9-223798
Sep. 17, 1997 (JP) .................................................. 9-251915

(51) Int. Cl.$^7$ ............................. G01F 23/30; G01F 23/26
(52) U.S. Cl. ........................ 73/305; 73/322.5; 73/304 C; 702/55
(58) Field of Search .............................. 73/304 C, 304 R, 73/305, 322.5; 702/52, 55

(56) References Cited

U.S. PATENT DOCUMENTS 3,974,695 * 8/1976 Lerner ................................. 73/304 C
4,176,553 * 12/1979 Wood ................................... 73/304 C
4,284,951 * 8/1981 Dahl et al. ........................... 73/304 R
4,788,488 * 11/1988 Kramer et al. ....................... 73/304 C

FOREIGN PATENT DOCUMENTS

JP-61264221-A * 11/1986 (JP) ........................................ 73/305

* cited by examiner

Primary Examiner—Hezron Williams
Assistant Examiner—Michael Cygan
(74) Attorney, Agent, or Firm—Morrison Law Firm

(57) ABSTRACT

A sensor for detecting levels of fluids and particulate matter is based on differences in dielectric constants of the various materials. The difference is reflected in different capacitance across electrodes immersed to different depths in such materials. A square-wave clock pulse is input into circuit composed of the capacitance and a resister in series. The output voltage is fed into a logic unit (such as exclusive-OR), which converts the exponential decay of the voltage into a pulse of uniform height with duration proportional to the time constant (proportional to the capacitance) of the exponential decay. The pulse is optionally fed through a low-pass filter to give a signal proportional to the duration.

9 Claims, 35 Drawing Sheets

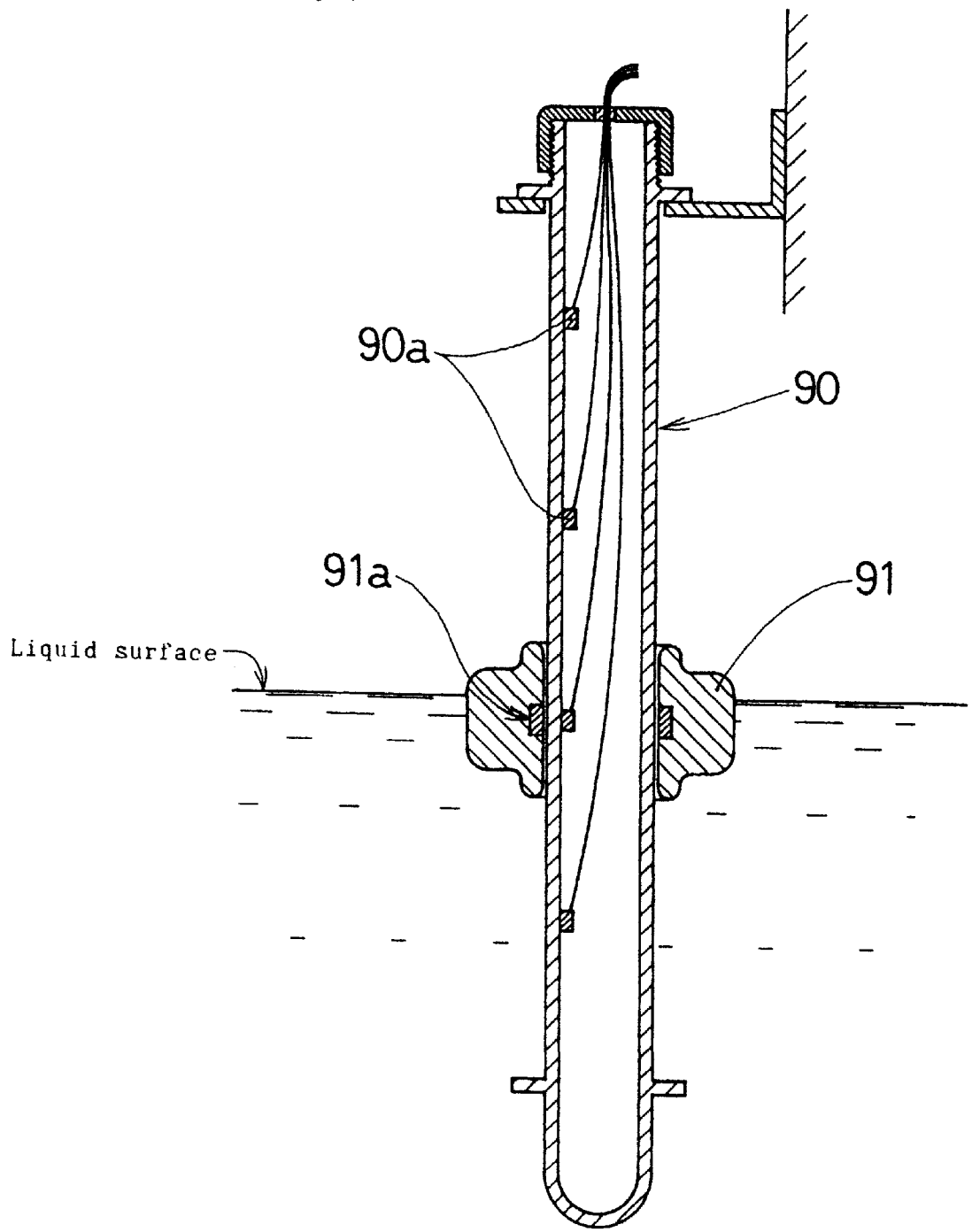

FLOAT-SUPPORTED DIELECTRIC LEVEL SENSOR

This application is a division of Ser. No. 09/116,642, filed Jul. 16, 1998.

BACKGROUND OF THE INVENTION

The present invention relates to a level sensor for detecting the level of a liquid or a powder or particulate accumulation (hereinafter referred to as a powder or particulate level).

One example of this type of level sensor is shown in FIG. 35. This sensor includes a pipe member 90 having a plurality of vertically disposed proximity switches 90a, and a float 91 surrounding pipe member 90 and having a magnet 91a on its inner peripheral side.

The magnet 91a moves up and down with the float in response to the rise and fall of the liquid surface. In this level sensor, the level of liquid can be determined by sensing which proximity switch 90a the magnet 91a is next to.

The following problems exist in this known level sensor:

(1) Since sensing is possible only when the float 91 comes to a certain position where one of the proximity switches 90a is present, the liquid level can be determined only up to certain discrete values.

(2) Since the float 91 moves up and down with respect to the pipe member 90, dust and the like can become clogged between the float 91 and the pipe member 90, thereby inhibiting the smooth response of the float 91, and resulting in failure to detect the level of the liquid. In other words, many mechanical elements end up with poor reliability.

(3) This sensor cannot detect the level of the interface between an upper liquid layer and a lower liquid layer.

OBJECTS AND SUMMARY OF THE INVENTION

It is therefore an object of the present invention to provide a liquid level sensor which overcomes the limitations of the prior art.

It is another object of the present invention to provide a level sensor with which a liquid level or a powder or particulate level can be determined continuously with high reliability.

It is a further object of the present invention to provide a level sensor in which a level of the interface between two fluid layers can be detected.

Briefly stated, the present invention provides a sensor for detecting levels of fluids and particulate matter based on differences in dielectric constants of the various materials. The difference is reflected in different capacitance across electrodes immersed to different depths in such materials. A square-wave clock pulse is input into circuit composed of the capacitance and a resister in series. The output voltage is fed into a logic unit (such as exclusive-OR), which converts the exponential decay of the voltage into a pulse of uniform height with duration proportional to the time constant (proportional to the capacitance) of the exponential decay. The pulse is optionally fed through a low-pass filter to give a signal proportional to the duration.

According to an embodiment of the invention, there is provided a level sensor for detecting a level of one of liquid, and a particulate material comprising: a capacitance type variable capacitor having an electrode having a capacitance responsive to surrounding stray capacitance, a resistor connected with the variable capacitor to form an integration circuit, the integration circuit having a time constant responsive to the capacitance and a value of the resistor, a logic device, the integration circuit receiving a clock having a constant frequency and duty ratio, an output from the integration circuit is input to the logic device, and the integration circuit producing an output from the logic device which varies according to change in capacitance of a capacitance plus a stray capacitance of the variable capacitor in response to change in length of a portion of the electrode immersed in the material.

According to a feature of the invention, there is provided a level sensor for detecting a level of one of a liquid object and a particulate object comprising: an electrode susceptible to surrounding stray capacitance, a resistor connected with the electrode to form an integration circuit, a logic device, the integration circuit receiving clock of a constant frequency and duty ratio, an output from the integration circuit is input to the logic device, and an output from the logic device varies depending on a change in the stray capacitance produced in surroundings of the electrode in response to a change in length of a portion of the electrode immersed in the object.

According to a further feature of the invention, there is provided a level sensor for detecting a level of one of a liquid and a particulate material comprising: an electrode susceptible to surrounding stray capacitance, a capacitor, a fixed resistor, a logic device, the resistor and a combined element made up of the electrode and the capacitor constituting an integration circuit, the integration circuit receiving a clock having a constant frequency and duty ratio, an output from the integration circuit is input to the logic device, and an output from the logic device varies according to change in a capacitance of a capacitance of the fixed capacitor plus a stray capacitance of the electrode in response to a change in length of a portion of the electrode immersed in the object.

According to a still further feature of the invention, there is provided a level sensor for detecting a level of one of a liquid and a particulate material comprising: at least three electrodes mutually arranged in parallel to form at least two variable capacitors, associated fixed resistors respectively connected to the capacitors to form at least first and second integration circuits which have time constants different from each other, a logic device, the first and second integration circuits receiving a clock having a constant frequency and duty ratio, an output from the integration circuits is input to the logic device, and an output from the logic device varies depending on change in capacitance of a capacitance plus a stray capacitance of the variable capacitors in response to change in length of a portion of the variable capacitors immersed in the object.

According to another feature of the invention, there is provided a level sensor for detecting a level of an interface between an upper layer and a lower layer, the upper and lower layers having different dielectric constants comprising: a float, a capacitance type variable capacitor having two electrodes arranged mutually in parallel, the variable capacitor being supported by the float, a resistor connected to the variable capacitor to form an integration circuit, a logic device receiving an output of the integration circuit, the variable capacitor extending downward into the upper and lower layers when the float is floated on a surface of the upper layer, whereby a capacitance of the variable capacitance is varied by an amount related to a thickness of the upper layer, the integration circuit receiving a clock having a constant frequency and duty ratio, an output from the integration circuit is input to the logic device, and a duty ratio of an output of the logic device varies according to change in capacitance of a capacitance plus a stray capacitance of the variable capacitor in response to change in length of a portion of the capacitor immersed in the upper liquid layer.

According to another feature of the invention, there is provided a level sensor for detecting a level of an interface between an upper liquid layer and a lower liquid layer comprising: a float, a plurality of variable capacitors having electrodes arranged mutually in parallel at equal intervals supported on the float, resistors connected to respective variable capacitors to form integration circuits having different time constants, and a logic device, the float being floated on a liquid surface with the plurality of variable capacitors extending downward immersing the electrodes in the two liquid layers, the integration circuits receiving a clock having a constant frequency and duty ratio, an output from the integration circuit is input to the logic device and a duty ratio of an output of the logic device varies depending on capacitances of a capacitance plus a stray capacitance of the variable capacitors in response to change in length of a portion of the capacitors immersed in the upper liquid layer.

According to a still further feature of the invention, there is provided a level sensor for detecting a level of an interface between an upper liquid layer and a lower liquid layer comprising: a float, an electrode supported on the float, the electrode being a variable capacitor whose capacitance varies in relation to an amount by which it is immersed in the upper and lower liquid layers, a resistor which, with the electrode constitutes an integration circuit, the electrode extending downward from the float through the upper liquid layer and partly into the lower liquid layer, a logic device receiving an output of the integration circuit, the integration circuit receiving a clock having a constant frequency and duty ratio, an output from the integration circuit is input to the logic device, a duty ratio of an output of the logic device varies depending on a capacitance of a capacitance plus a stray capacitance of the variable capacitor in response to change in length of a portion of the electrode immersed in the upper layer liquid, whereby a thickness of the upper liquid layer can be determined.

According to a final feature of the invention, there is provided a level sensor comprising: a variable capacitor, the variable capacitor having a capacitance which varies in response to a dielectric constant of a surrounding material, a resistor combined with the variable capacitor to form an integration circuit, a time constant of the integration circuit being established by values of the resistor and the capacitance, support means for supporting the variable capacitor partly immersed in the material, whereby the capacitance varies in response to an amount by which the variable capacitor is immersed, a logic device receiving an output of the integration circuit, the logic device being responsive to the time constant to produce an output signal having a characteristic related to the capacitance.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 35 is a view of a prior art level sensor.

DETAILED DESCRIPTION OF THE PREFERRED EMBODIMENTS

Embodiment 1

Figure 1:
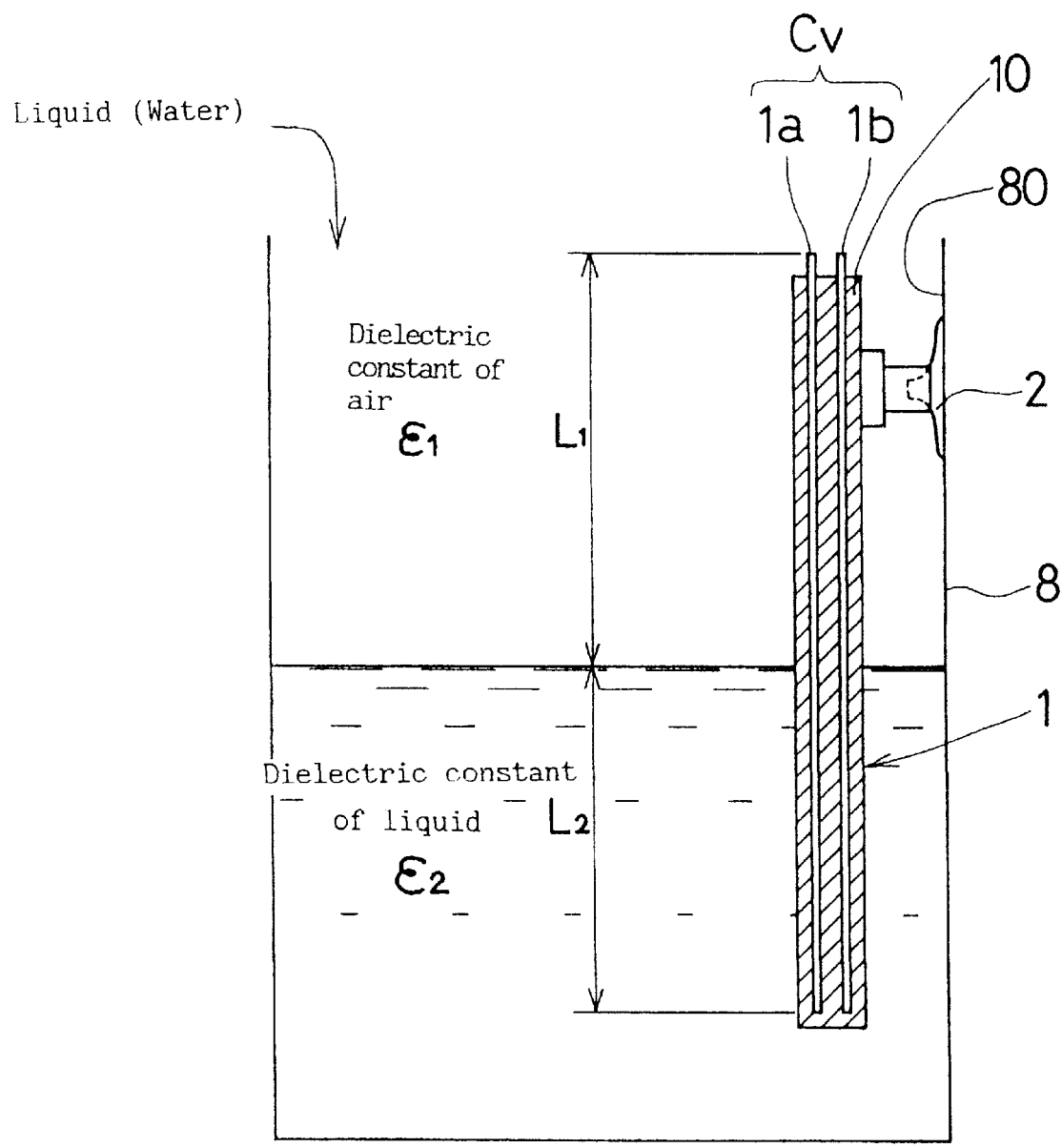
FIG. 1 is a section view of Embodiment 1 of a level sensor of the present invention in which a sensor body is attached to a fixed wall of a container.
Figure 2:
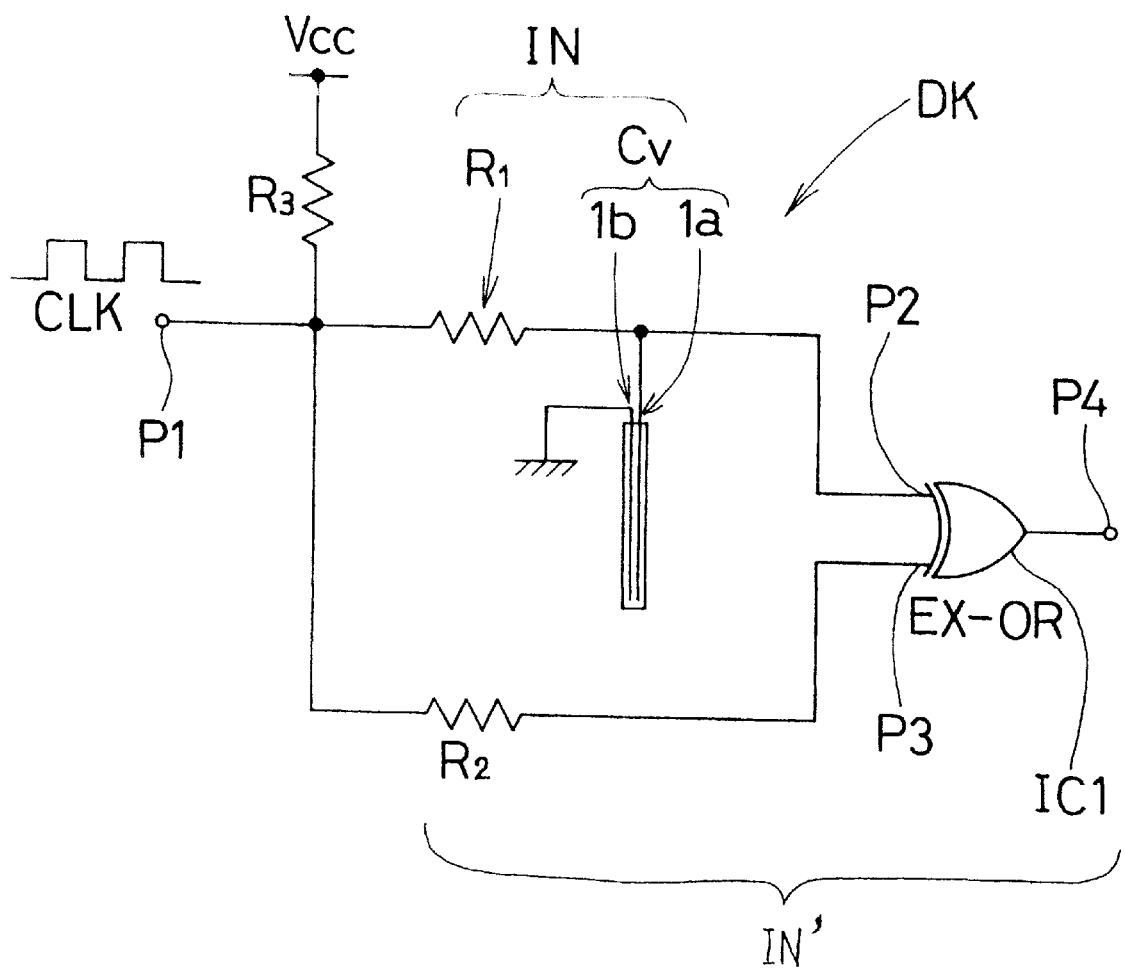
FIG. 2 is a diagram of a detection circuit of Embodiment 1.

Referring to FIGS. 1 and 2, a level sensor in Embodiment 1, especially adapted for use in detecting the level of a liquid, includes a sensor body 1 and a detection circuit DK. The sensor body 1 has a variable capacitor $C_V$, whose capacitance varies in a known way with the level of liquid. The detection circuit DK outputs a signal corresponding to the change in capacitance, including stray capacitance, in the variable capacitor $C_V$ resulting from the change of a portion of the sensor body 1 immersed in the liquid.

The sensor body 1, shown in FIG. 1, includes the variable capacitor $C_V$ which includes parallel electrodes 1a and 1b, having a mutual capacitance which is responsive to the amount of sensor body 1 which is immersed in the liquid. A coating of synthetic resin (or rubber) covers the variable capacitor $C_V$. The sensor body 1 is also provided with an acetabulum, or suction cup, 2 to attach it to a fixed wall 80 of a container 8.

A potential difference between the electrodes 1a and 1b yields capacitance in the variable capacitor $C_V$. Since the dielectric constant $\epsilon_1$ in the surrounding air is smaller than the dielectric constant $\epsilon_2$ in the surrounding liquid ($\epsilon_1 < \epsilon_2$) the capacitance in the sensor body 1 varies with the liquid level.

The terms used to denote signals are as follows:

Capacitance between the electrodes 1a and 1b: $C_{ab0}$

Stray capacitance in the air surroundings: $C_{ab1}$

Stray capacitance in the liquid surroundings: $C_{ab2}$

In the case where the liquid is water, the ratio of $C_{ab1}$ to $C_{ab2}$ is 1:80. The total capacitance produced by the electrodes 1a and 1b is $C_{ab}=C_{ab0}+C_{ab1}+C_{ab2}$. $C_{ab1}$ and $C_{ab2}$ are respectively proportional to the length $L_1$ of the portions of the electrodes 1a and 1b in the air and the length $L_2$ of the portions of the electrodes 1a and 1b in the liquid. As a result, the total capacitance $C_{ab}$ varies substantially linearly with liquid level.

The detection circuit DK, shown in FIG. 2, includes fixed resistors $R_1$, $R_2$, and $R_3$, the foregoing variable capacitor $C_V$, and an exclusive-OR logic unit, EX-OR logic IC1. The resistor $R_1$ and the variable capacitor $C_V$ constitute an integration circuit IN with a time constant equal to $R_1 C_V$. The resistor $R_2$ and the EX-OR logic IC1 constitute another integration circuit IN' with a time constant equal to an input capacitance $C_{in2}$ of the EX-OR logic IC1 multiplied by $R_2$. Although the time constant established by the resistor $R_1$ is influenced by the input capacitance $C_{in1}$ of the EX-OR logic IC1 as well as by $C_V$; the total capacitance is so much greater than the input capacitance ($C_{ab} >> C_{in1}$) of these elements that they can be ignored.

Figure 3:
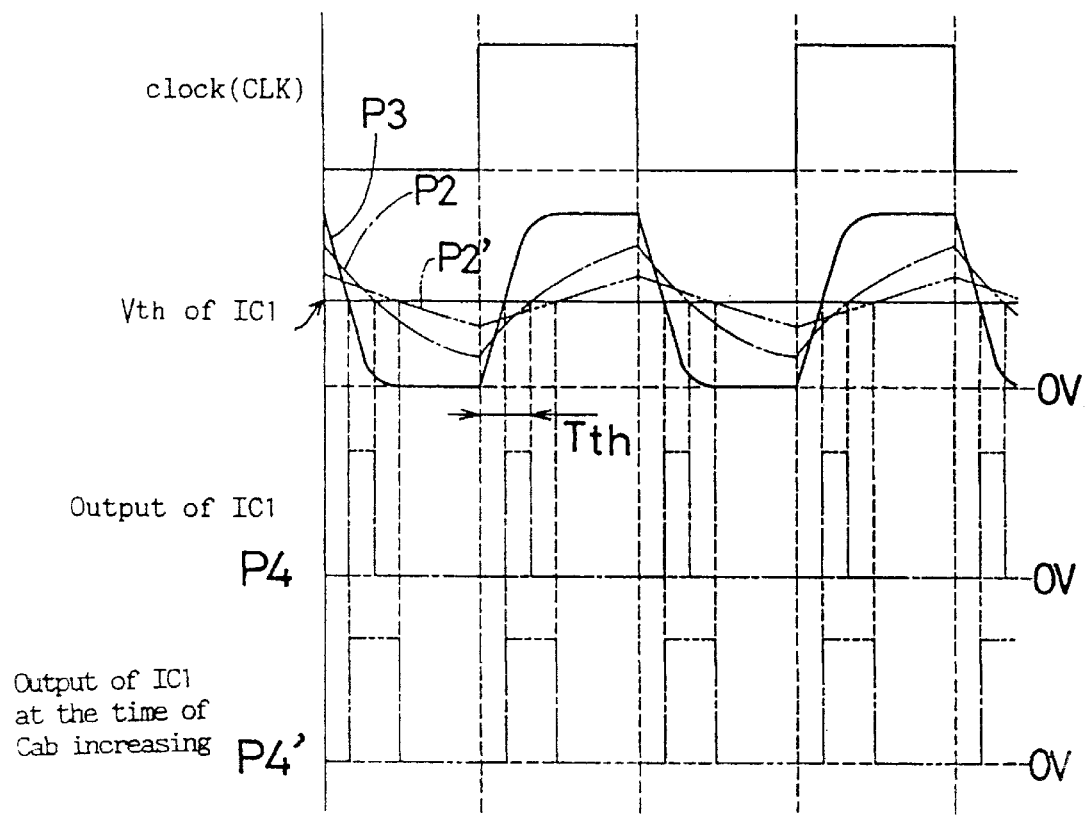
FIG. 3 is a diagram showing relationships between the input clock and various output voltages when using the detection circuit of Embodiment 1.

The operation of the detection circuit DK according to change of the liquid level in the container 8 is described below in conjunction with FIGS. 2 to 4:

(1) A clock CLK is input to P1. The time constants $R_1 C_{ab}$ and $R_2 C_{in2}$ at positions P2 and P3 produce integration waveforms P2 and P3 as shown in FIG. 3.

(2) Since the stray capacitance in the air surroundings is smaller than that in the liquid surroundings ($C_{ab1} < C_{ab2}$), a rise in the liquid level increases the total capacitance, and consequently increases the time constant $R_1 C_{ab}$. The waveform of the position P2 here changes into a less inclined waveform P2' in FIG. 3. The threshold time ($T_{th}$ in FIG. 3) that it takes P2 (or P2') to follow the clock signal becomes longer. The EX-OR IC1 produces an output when, and only when, one of its two inputs exceed threshold $V_{th}$. As the liquid level increases the output of the EX-OR logic IC1 changes from P4 to P4' in FIG. 3. This lengthens the signal during each clock cycle. In other words, the change in liquid level appears as the change in the duty ratio of output of the EX-OR logic IC.

(3) The output of the EX-OR logic IC, P4, is passed through a low-pass filter (not shown), and thereby becomes an analog voltage, having an amplitude related to the duty ratio. As shown in FIG. 4, the output voltage increases approximately linearly with the rise of the liquid level. Although the change of the liquid level and the change of the output duty ratio of the EX-OR logic IC1 are not exactly proportional, an appropriate circuit constant insures practically sufficient linearity.

Figure 4:
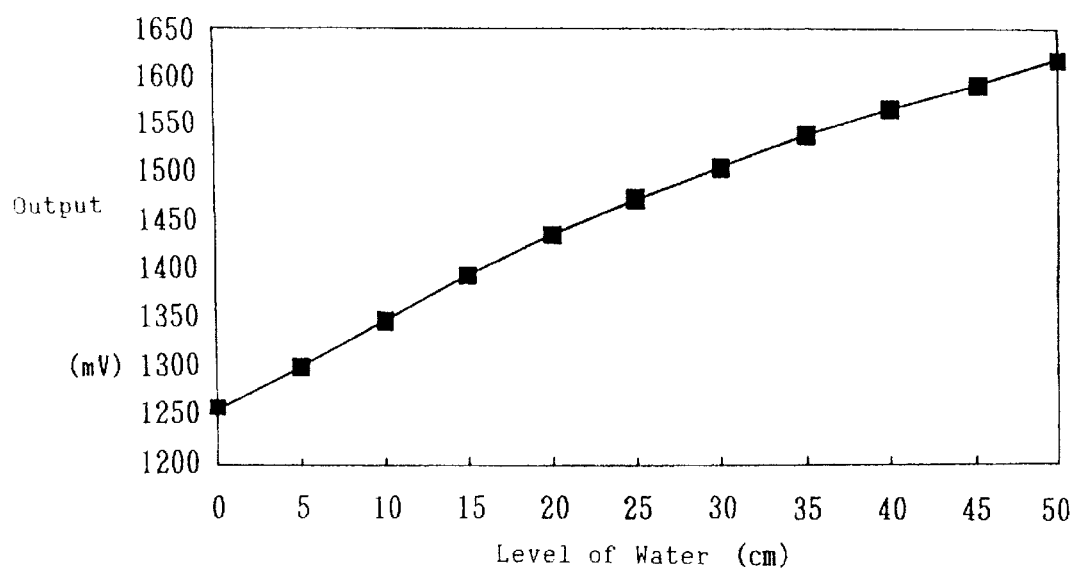
FIG. 4 is a graph showing the relation between an output and a water level in Embodiment 1.

FIG. 4 shows the relation between the output (mV) and the water level (cm) when the electrodes 1a and 1b of the variable capacitor $C_V$ are set at a height of 600 mm. It shows that practically sufficient linearity is obtained.

(4) The detection circuit DK in FIG. 2 can be assembled with a low-pass filter in a small printed circuit substrate of about 25 mm in diameter.

(5) As apparent from the above statements (3) and (4), the level sensor according to the present invention can be made very compact and at low cost. Also, since this level sensor has no mechanical operation parts, it is very reliable.

Embodiment 2

Figure 5:
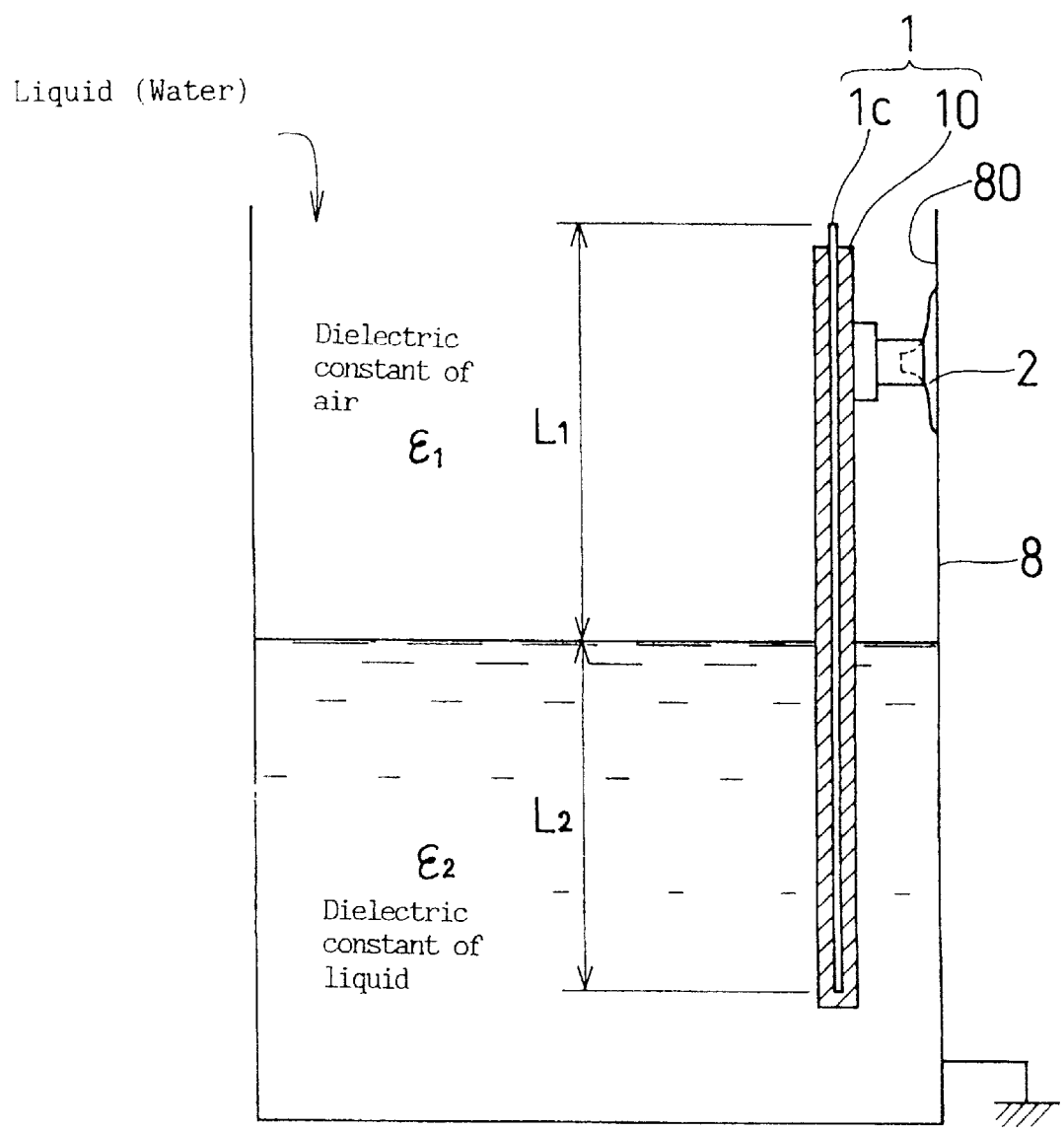
FIG. 5 is a section view of Embodiment 2 of a level sensor of the present invention in which a sensor body is attached to a fixed wall of a container.
Figure 6:
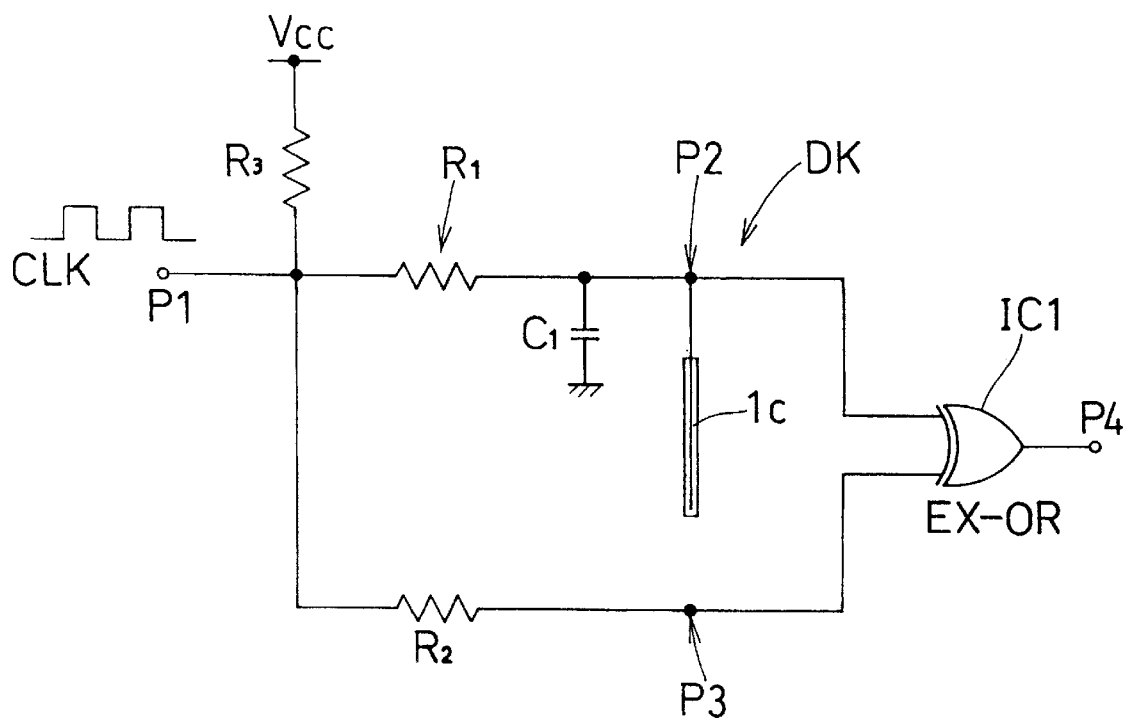
FIG. 6 is a diagram of a detection circuit of Embodiment 2.

Referring now to FIGS. 5 and 6 the level sensor of Embodiment 2 includes a sensor body 1 and a detection circuit DK. The detection circuit DK outputs a voltage corresponding to the capacitance variance in response to the change in the portion of the sensor body 1 immersed in the liquid.

FIG. 5 illustrates the sensor body 1 having a single electrode 1c designed to be susceptible to the surrounding stray capacitance. Electrode 1c is covered by a synthetic resin coating 10. The sensor body 1 is affixed to a fixed wall 80 of a container 8 using an acetabulum or suction 2. The container 8 is grounded to stabilize the operation of the detection circuit.

The difference between the dielectric constant of the liquid surrounding the sensor body 1 and that of the air surrounding the sensor body 1 causes the stray capacitance to vary depending on the level of the liquid.

The terms used to denote signals are as follows:

Total stray capacitance surrounding the sensor body 1: $C_s$

Stray capacitance in the air surrounding the sensor body 1: $C_{s1}$

Stray capacitance in the liquid surrounding the sensor body 1: $C_{s2}$

Dielectric constant of the air: $\epsilon_1$

Dielectric constant of the liquid: $\epsilon_2$ (with $\epsilon_1 < \epsilon_2$)

The total capacitance $C_s$ is the sum of $C_{s1}$ and $C_{s2}$. $C_{s1}$ and $C_{s2}$ are respectively proportional to the lengths $L_1$ and $L_2$ of the electrode 1c as shown in FIG. 5. Consequently the total capacitance $C_s$ varies in a known way in response to the liquid level.

The detection circuit DK, as shown in FIG. 6, includes fixed resistors $R_1$, $R_2$, and $R_3$, a fixed capacitor $C_1$, the above-mentioned sensor body 1 and an EX-OR logic IC1. The resistor $R_1$ and the combination of the fixed capacitor $C_1$ and the electrode 1c constitute an integration circuit. The resistor $R_2$ and the EX-OR logic IC1 constitute another integration circuit. The resistor $R_1$ is also influenced by the input capacitance of the EX-OR logic IC1. However, since the input capacitance is much smaller than the capacitance of the combination of the fixed capacitor $C_1$ and the electrode 1c, the input capacitance is herein neglected.

The operation of the detection circuit DK at the time of the change in the liquid level in the container 8 using water as a liquid is described with reference to FIGS. 5–7. A clock CLK with a constant frequency and duty ratio is input to the point P1 of the detection circuit $DK_s$.

Figure 7:
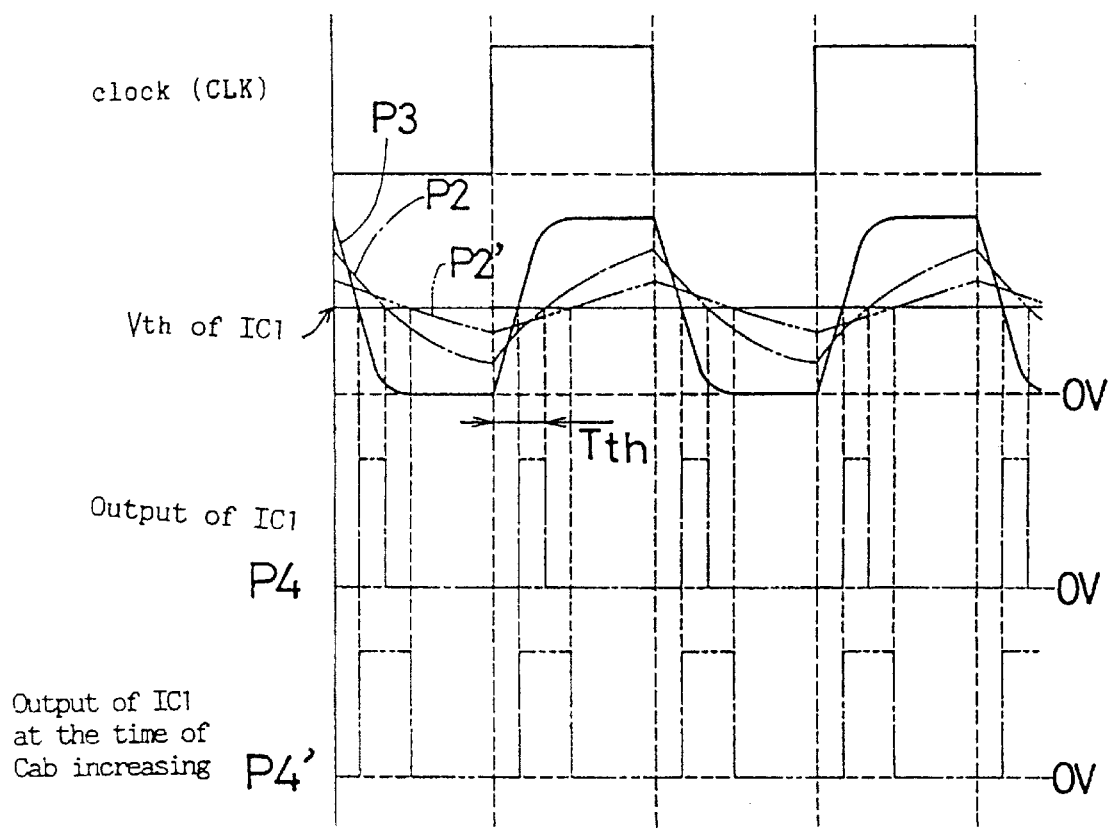
FIG. 7 is a diagram showing the relation among the input clock and various output voltages when using the detection circuit of Embodiment 2.

(1) The voltage waveforms at the points P2, P3, and P4 when the liquid (water) level rises to a height $L_2$ from the bottom of the sensor body 1 are shown in FIG. 7.

(2) When the water level further rises to a height $L_2'$ ($L_2 < L_2'$) from the bottom of the sensor body 1, the stray capacitance in the surroundings of the sensor body 1 changes to $C_s'$ ($C_s < C_s'$). Subsequently, the waveform at the point P2 changes from P2 to P2' shown in FIG. 7. Accordingly, the duty ratio of the output pulse of the EX-OR logic IC1 changes to the output P4'.

(3) An additional low-pass filter (not shown) receiving the signal from the point P4, converts the output of the EX-OR logic IC1 to an analog voltage which increases in response to the rise of the water level, in a manner similar to Embodiment 1.

Figure 8:
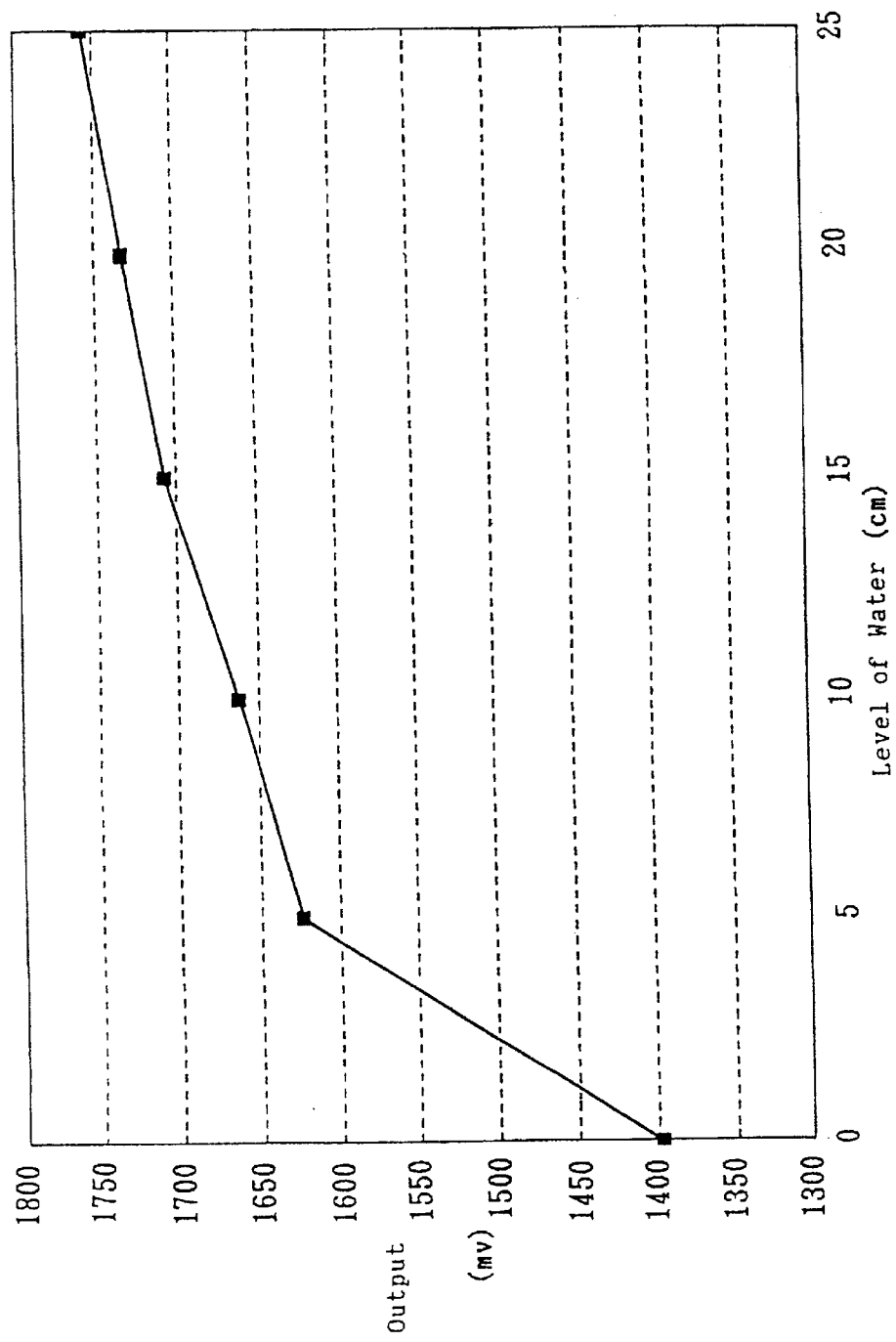
FIG. 8 is a graph showing the relation between an output and a water level in Embodiment 2.

(4) FIG. 8 shows measurements of the output voltage depending on the liquid level in the detection circuit DK of FIG. 6 with the low-pass filter. At water levels near 0 cm (before the water level reaches the bottom of the sensor body 1), the output voltage shows a sharp change with water level below the bottom of the sensor body 1. This is because the dielectric constant of water (about 80) is considerably larger than that of air (about 1). As soon as measurements are made with sensor body 1 at least slightly immersed in the water, the relationship between output and water level returns to the roughly linear, without such sharp change. However, the sharp change near zero can be used as a reliable method of detecting when the liquid first enters the container 8 and when the liquid level reaches the bottom of the sensor body 1.

Figure 9:
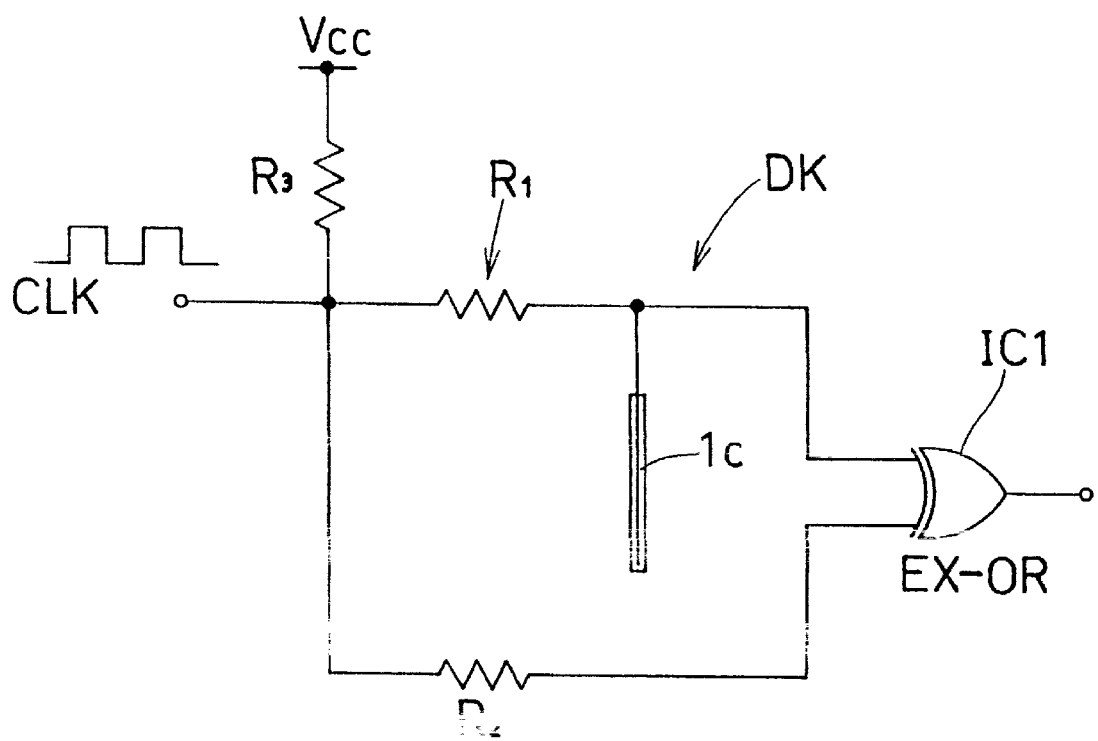
FIG. 9 is a modification of the detection circuit of Embodiment 2.

(5) As an alternative, a detection circuit DK of FIG. 9 may be substituted for the detection circuit DK of FIG. 6. The detector circuit DK of FIG. 9 omits the fixed capacitor $C_1$ of FIG. 6.

Embodiment 3

Figure 10:
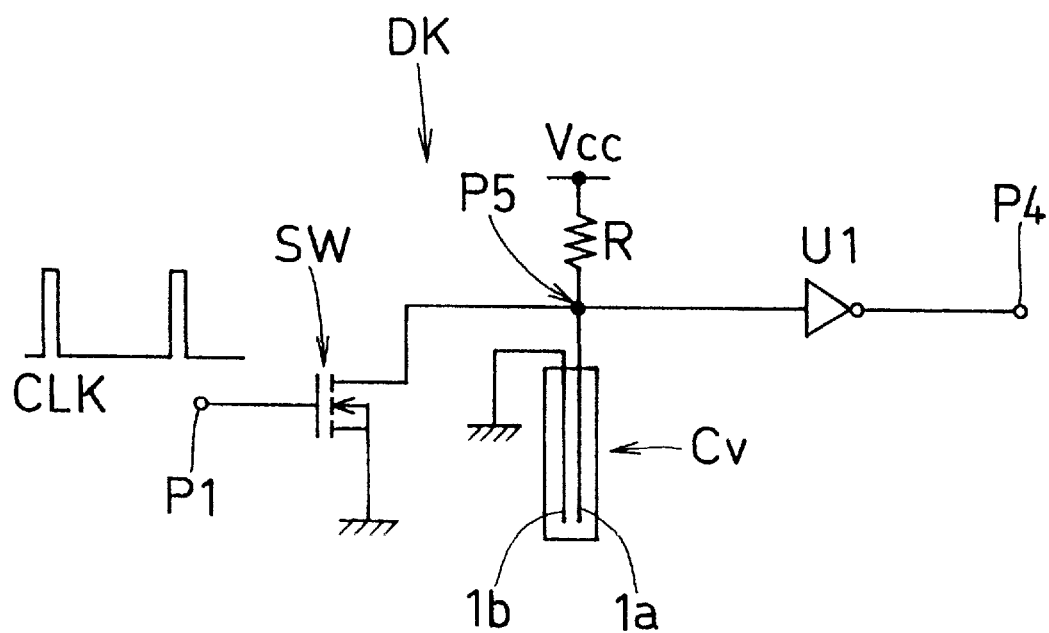
FIG. 10 is a diagram of a detection circuit of Embodiment 3.

Referring now to FIG. 10, Embodiment 3 of the present invention, employs a detection circuit DK shown which provide improved output stabilization over a broad input frequency range.

In the detection circuit DK in FIG. 10, a voltage $V_{CC}$ is applied to an electrode 1a of a variable capacitor $C_V$ through a fixed resistor R. An electrode 1b of the variable capacitor $C_V$ is grounded. An output electrode of a switching element SW and an input of an inverter IC U1 are connected to junction P5 of the variable capacitor $C_V$ and the resistor R.

The switching element SW (a Field Effect Transistor) rapidly switches the potential of the junction P5 from its value established by the voltage Vcc through the pull-up resistor R to a level near ground (zero volts). At the end of the clock pulse, the voltage rises with a time constant established by the resistance of resistor R and the capacitances in detection circuit DK (principally, the capacitance in variable capacitor $C_V$.

Figure 11:
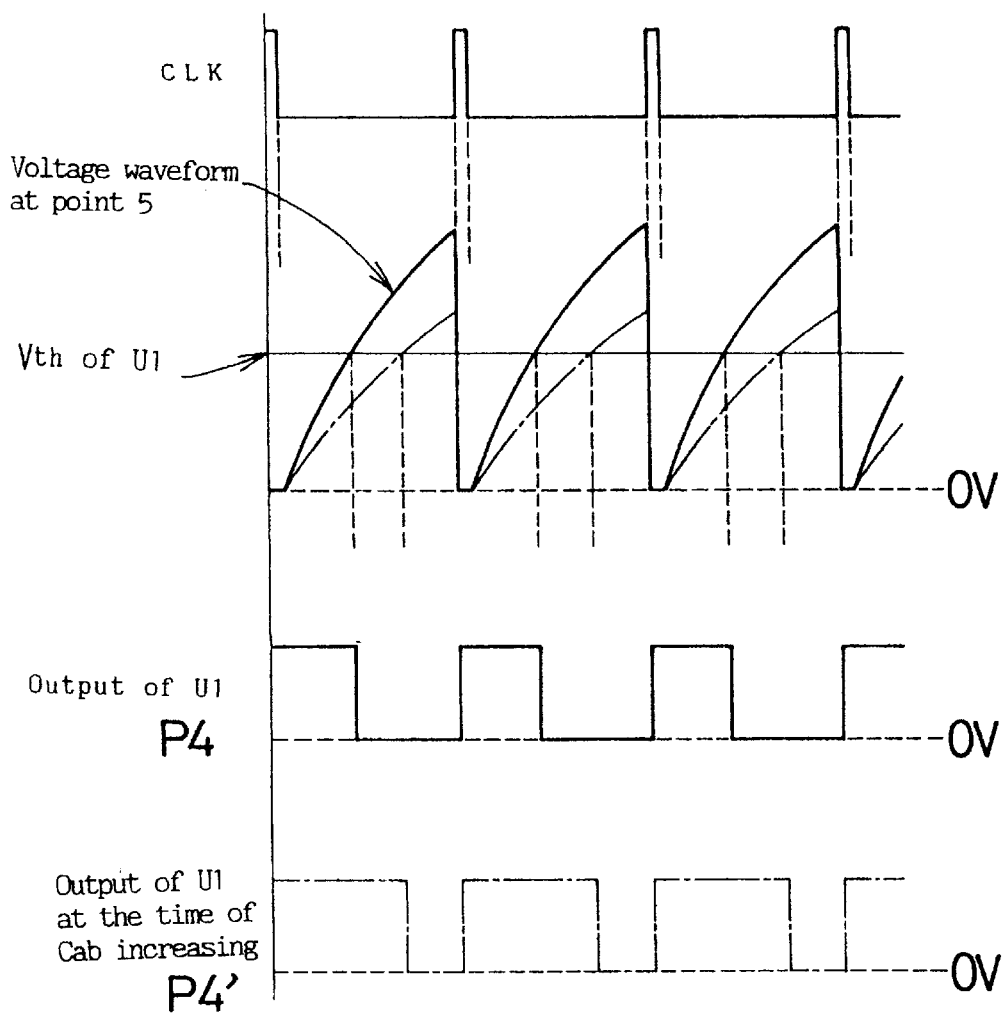
FIG. 11 is a diagram showing the relation among the input clock and various output voltages when using the detection circuit of Embodiment 3.
Figure 12:
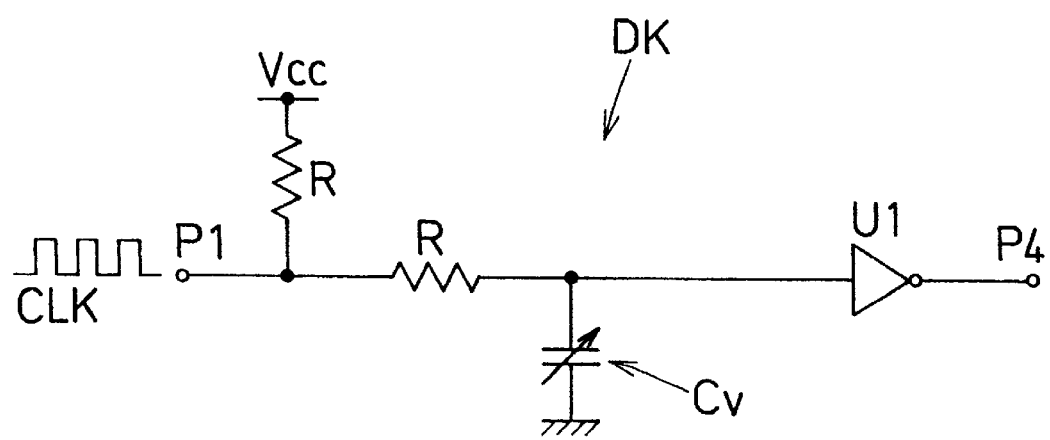
FIGS. 12 to 16 are diagrams of detection circuits of other embodiments of the present invention.
Figure 13:
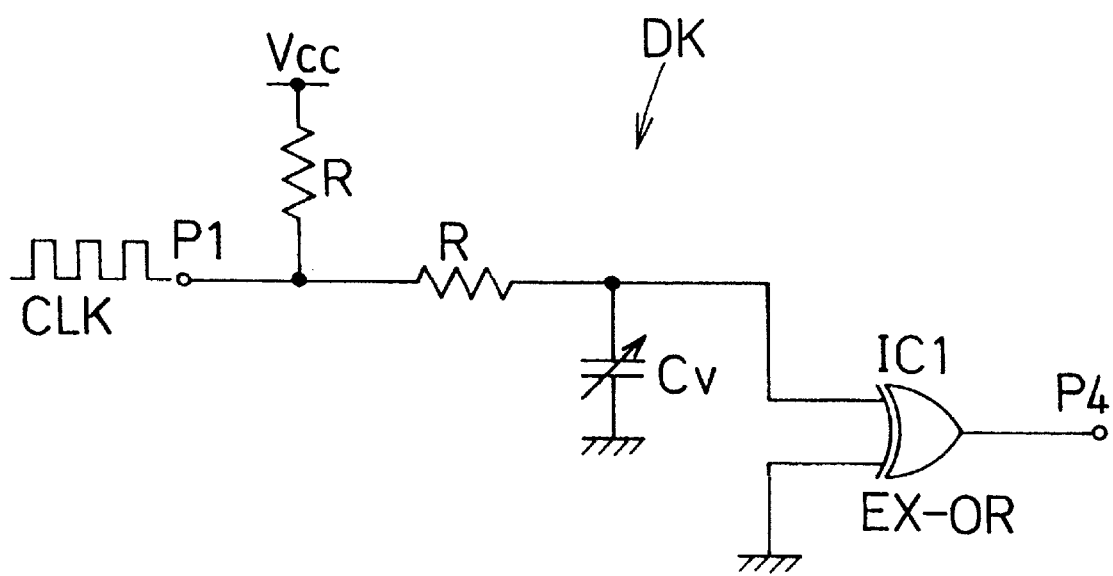
Figure 14:
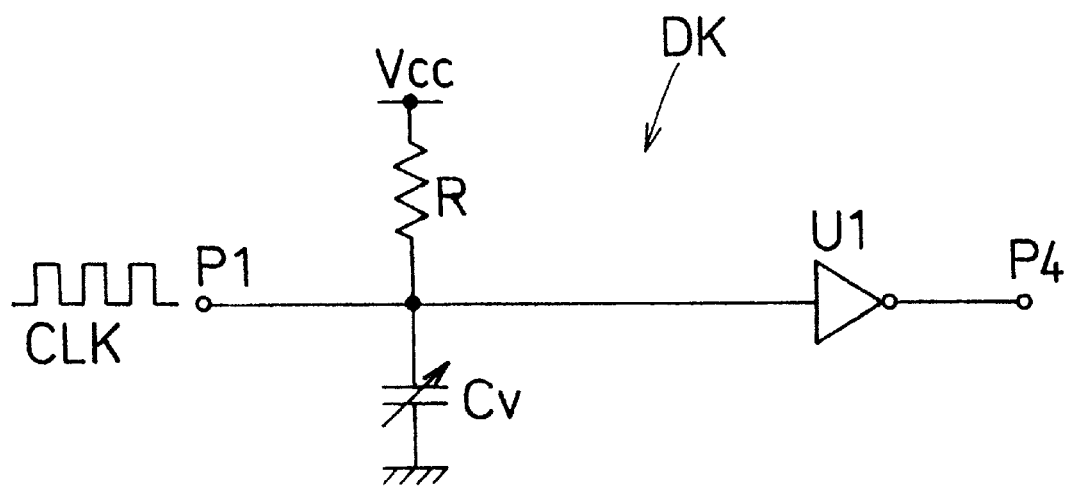
Figure 15:
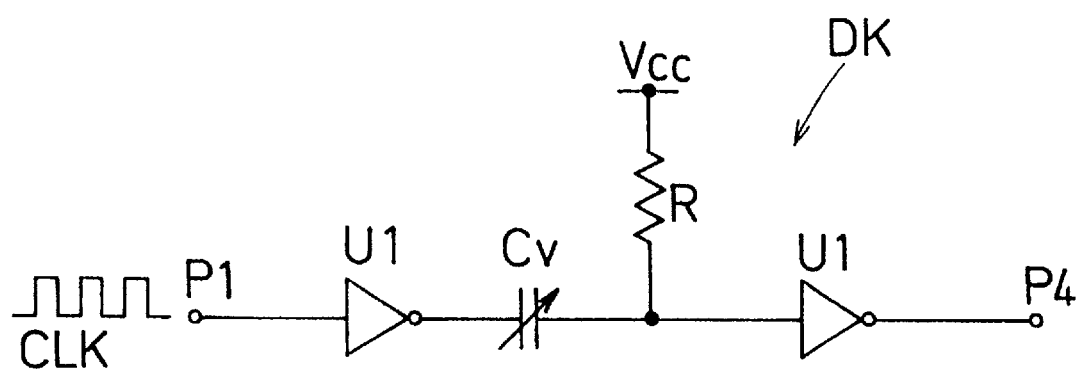
Figure 16:
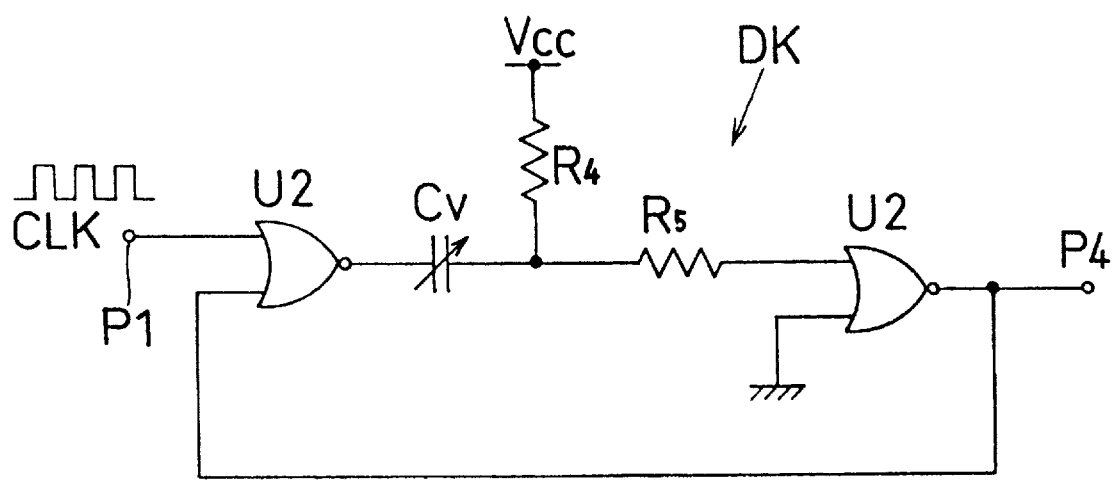

FIG. 11 shows the voltage waveform at the point P5 and the output voltage of the inverter IC when the detection circuit DK in FIG. 10 is used.

Alternatives to Embodiments 1, 2, and 3

In the foregoing embodiments, the variable capacitor $C_V$ with the electrodes 1a and 1b (Embodiment 1) and the electrode 1c (Embodiment 2) are coated with synthetic resin. Such a coating may not be necessary, depending on the kinds of liquid. In case of using a variable capacitor $C_V$ without synthetic resin coating, not only do the stray capacitances $C_{ab1}$ and $C_{ab2}$ ($C_{s1}$ and $C_{s2}$) vary, but the capacitance $C_{ab0}$ ($C_a$) itself also changes according to the liquid level. However, detection of the liquid level is still feasible by using the detection circuit DK as stated above. The electrodes 1a or 1b may be made of conductive wire or bar (with various cross-sectional shapes such as flat, round, or square).

A variety of detection circuits DK basically provided with an integration circuit and a logic IC1 may be selectively employed. Some examples are shown in FIGS. 12 to 16. In the drawings, R, $R_4$, $R_5$, $C_V$, U1 and U2 respectively denote resistors, a variable capacitor, an inverter IC and an NOR logic IC. In a detection circuit DK of FIG. 16, the time constant of $C_{ab}R_4$. $R_5$ is set optionally.

The above level sensors are described in an application where the level of liquid is measured. One skilled in the art will recognize that they may also be used to measure a level of any fluid-like material such as accumulated powder and granules. A liquid, having a relatively low viscosity, such as water, alcohol, petroleum, or sea water, can be measured.

Embodiment 4

Figure 17:
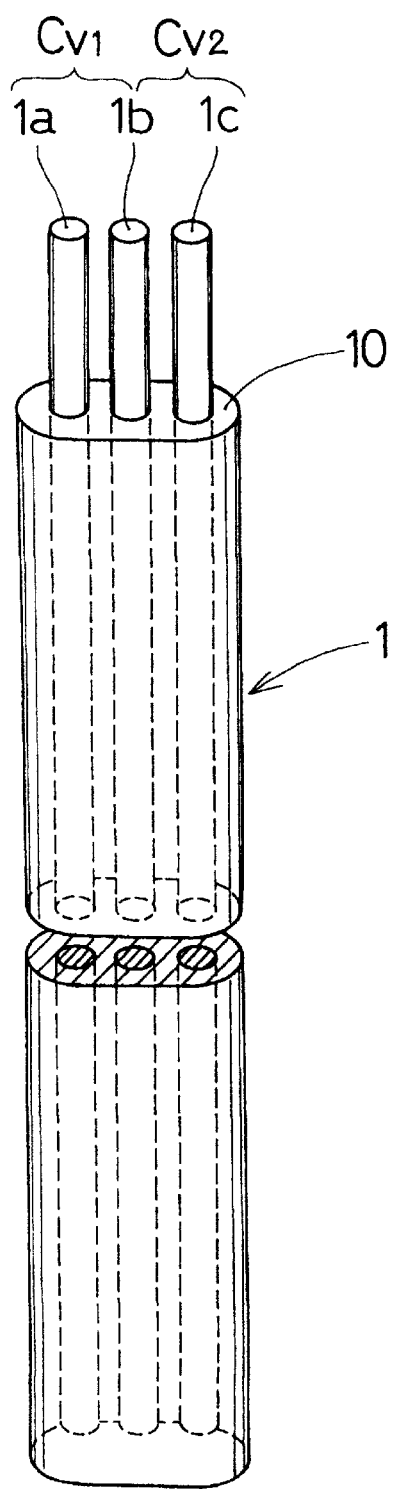
FIG. 17 is a perspective view of a sensor body of a level sensor according to Embodiment 4 of the present invention.
Figure 18:
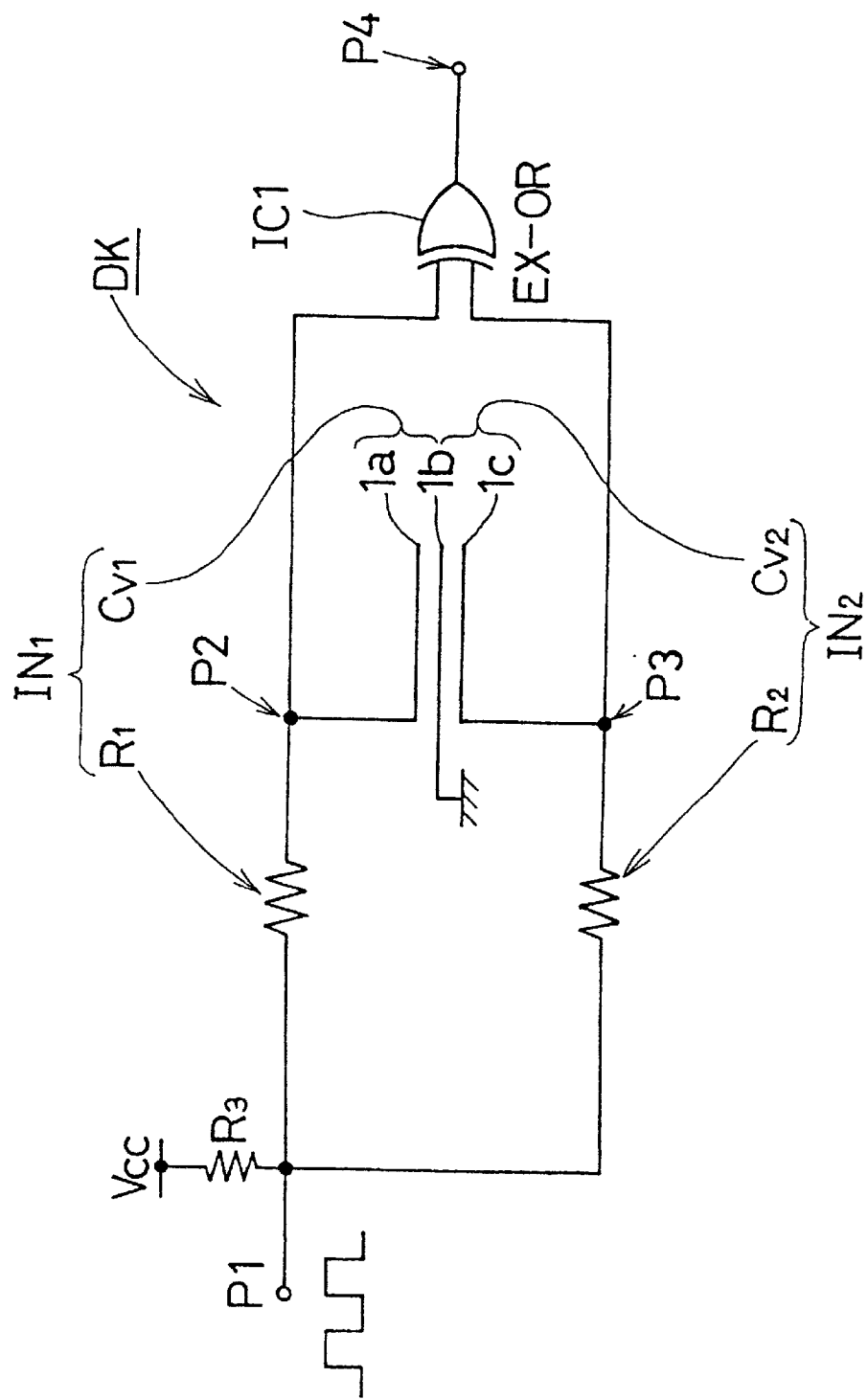
FIG. 18 is a diagram of a detection circuit of Embodiment 4.
Figure 19:
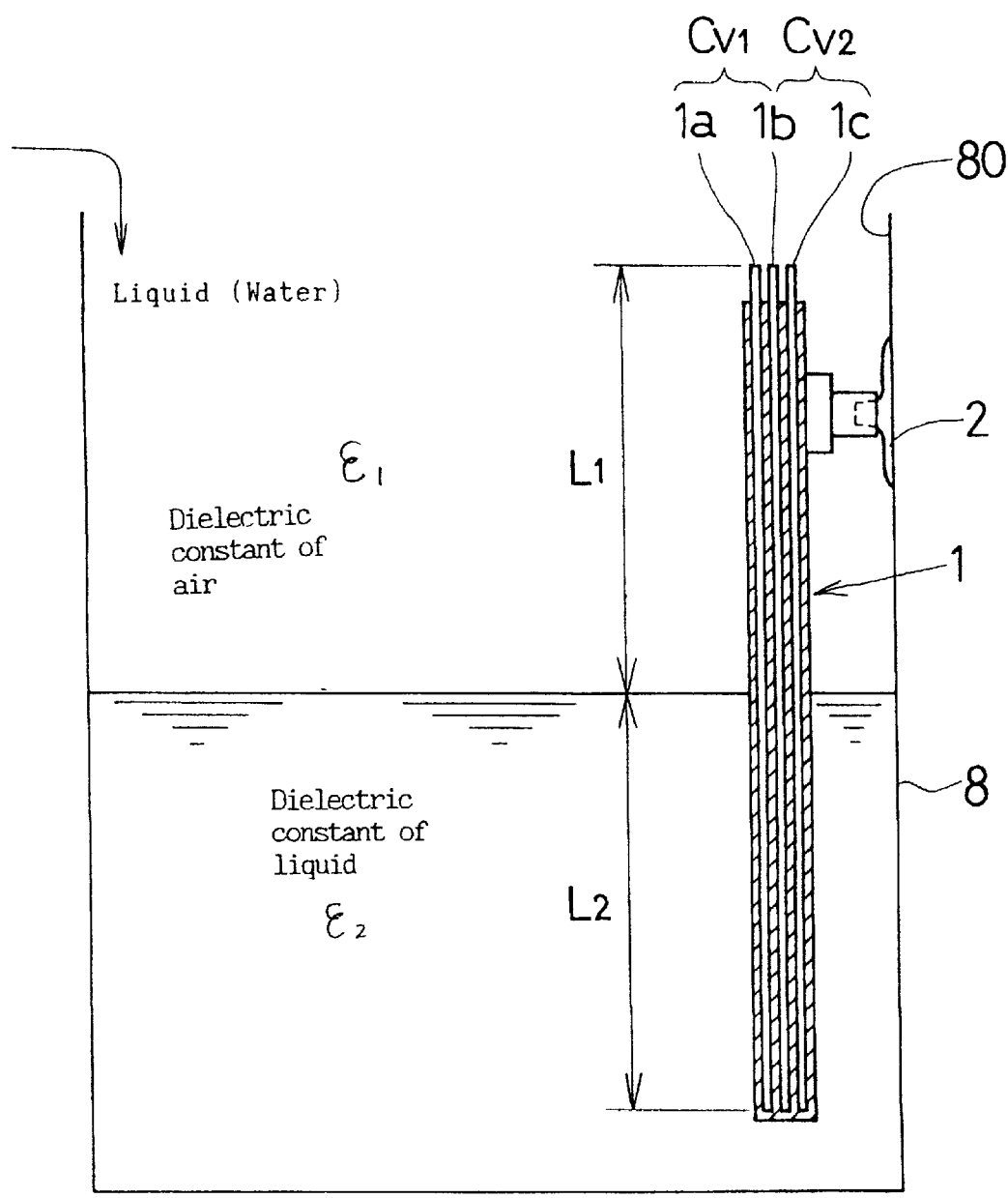
FIG. 19 is a section view in which the sensor body of FIG. 17 is attached to a fixed wall of a container.

Referring now to FIGS. 17 to 19, a level sensor in Embodiment 4 includes a sensor body 1 and a detection circuit DK. The sensor body 1 includes variable capacitors $C_{V1}$ and $C_{V2}$. The detection circuit DK outputs correspond to the change of capacitance, including the stray capacitance, of the variable capacitors $C_{V1}$, $C_{V2}$ in response to the change in the portion of the length of the capacitors $C_{V1}$, $C_{V2}$ that is immersed in the liquid.

As shown in FIGS. 17 and 19, the sensor body 1 includes electrodes 1a, 1b, and 1c susceptible to the surrounding stray capacitance. Electrodes 1a, 1b and 1c are disposed parallel to each other. Electrodes 1 a, 1b and 1c are covered with a synthetic resin coating 10 so as to form a single integrated unit containing two variable capacitors $C_{V1}$, $C_{V2}$. Here the electrodes 1a, 1b, and 1c are conductive wires. The sensor body 1 also has an acetabulum or suction cup 2 for attaching the sensor body 1 to a fixed wall 80 of a container 8 (FIG. 19).

When a voltage is applied to the electrodes 1a and 1c, and the center electrode 1b is connected to ground potential, stray capacitance is produced in the variable capacitors $C_{V1}$ and $C_{V2}$, which are respectively formed between the electrodes 1a and 1b, and 1b and 1c. Since there is a difference between the dielectric constant of the air surroundings and that of the liquid surroundings, stray capacitance produced around the variable capacitors $C_{V1}$ and $C_{V2}$ varies depending on the level of the liquid.

The terms used to denote signals are as follows:

Capacitance of the variable capacitor $C_{V1}$: $C_{ab0}$

Stray capacitance of the air surrounding the variable capacitor $C_{V1}$: $C_{ab1}$, Stray capacitance of the liquid surrounding the variable capacitor $C_{V1}$: $C_{ab2}$ Capacitance of the variable capacitor $C_{V2}$: $C_{bc0}$ Stray capacitance of the air surrounding the variable capacitor $C_{V2}$: $C_{bc1}$ Stray capacitance of the liquid surrounding the variable capacitor $C_{V2}$: $C_{bc2}$ Dielectric constant of the air: $\epsilon_1$ Dielectric constant of the liquid: $\epsilon_2$ (with $\epsilon_1 < \epsilon_2$)

The total capacitance $C_{ab}$ produced by the electrodes 1a and 1b is $C_{ab0} + C_{ab1}, + C_{ab2}$. The total capacitance $C_{bc}$ produced by the electrodes is $C_{bc0} + C_{bc1} + C_{bc2}$. The capacitances $C_{ab1}$ and $C_{bc1}$ are both related to portion of the length $L_1$ in FIG. 19. $C_{ab2}$ and $C_{bc2}$ are both related to the length $L_2$. Therefore, the total capacitances $C_{ab}$ and $C_{bc}$ change in a known way depending on the liquid level.

As shown in FIG. 18, the detection circuit DK includes fixed resistors $R_1$, $R_2$, and $R_3$, variable capacitors $C_{V1}$, and $C_{V2}$, and an EX-OR logic IC1. The resistor $R_1$ and the variable capacitor $C_{V1}$ constitute an integration circuit $IN_1$ (with time constant $R_1 C_{ab}$). The resistor $R_2$ and the variable capacitor $C_{V2}$ constitute another integration circuit $IN_2$ (with time constant $R_2 C_{bc}$). The fixed resistor $R_3$ is provided only to stabilize the operation; the detection circuit can operate without it.

The operation of the detection circuit DK at the time of the change in the liquid level in the container 8 using water as a liquid is described with reference to FIGS. 18 to 20.

Figure 20:
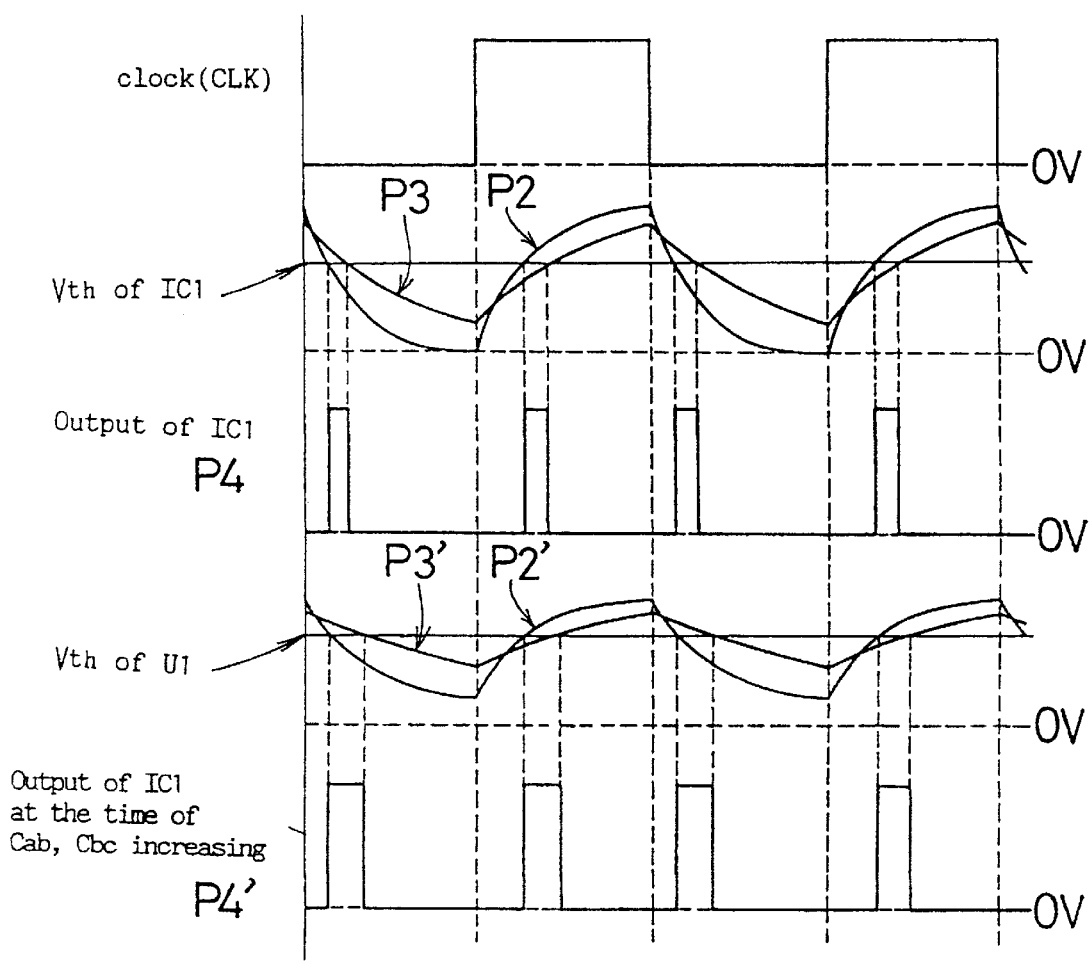
FIG. 20 is a diagram showing the relation among the input clock and various output voltages when using the detection circuit of Embodiment 4.

(1) When a clock CLK is input to a point P1 under the conditions $R_1 < R_2$, the time constants $R_1 C_{ab}$ and $R_2 C_{bc}$ cause integration waveforms P2 and P3 as shown in FIG. 20. The output of the EX-OR logic IC1 presents the output pulse P4 in FIG. 20 in response to the integration waveforms P2 and P3.

(2) When the liquid level rises from the a height $L_1$ and $L_2$ to a height $L_1$' and $L_2$' (with $L_1' < L_1$ and $L_2' > L_2$; see FIG. 19), the total capacitances change from $C_{ab}$ and $C_{bc}$ to $C_{ab}$' and $C_{bc}$' (with $C_{ab}' > C_{ab}$ and $C_{bc}' < C_{bc}$). As a result, the integration waveforms at the points P2 and P3 change to waveforms P2' and P3' (FIG. 20), corresponding to the time constants $R_1 C_{ab}$' and $R_2 C_{bc}$'. The output of the EX-OR logic IC1 presents a signal P4', having an increased duty ratio, as shown in FIG. 20.

(3) The output pulse of the EX-OR logic IC1 may be integrated in a subsequent low-pass filter (not shown) to produce an analog voltage corresponding to the liquid level.

Figure 21:
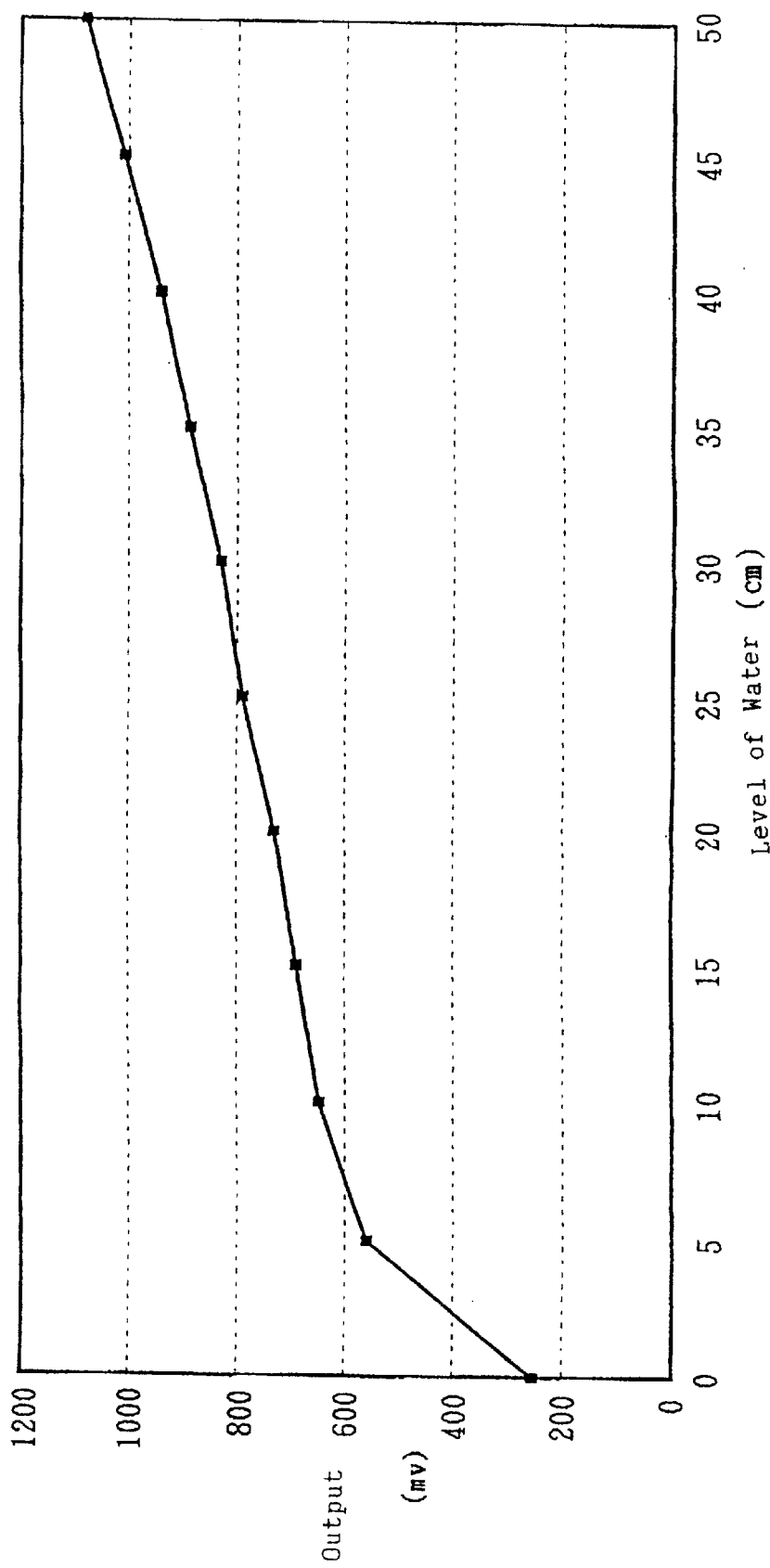
FIG. 21 is a graph showing the relation between an output and a water level in FIG. 19.

(4) FIG. 21 shows measurements of the level of water using the detection circuit DK (with $R_1$ set to 330 KΩ and $R_2$ set to 680 Ω) of FIG. 18. The output voltage therein is obtained by integrating the output pulses. The output voltage (mV) varies approximately in a straight line in a range between 5 to 50 cm in the water level, showing that the detection circuit DK is suitable for use as a level sensor. Because the dielectric constant of water (approx. 80) is much larger than the dielectric constant of air (approx. 1), the output voltage sharply changes from a water height of zero cm to a water height of 5 cm, where the water surface just comes in contact with the sensor body 1. However, levels near zero cm can be considered outside of the valid range, and cause no problem.

(5) This level sensor includes only the sensor body 1 in FIG. 17 and the detection circuit DK in FIG. 18 as stated above and therefore can be made at very low cost. Additionally, because this level sensor has no mechanical operation part, it is very reliable.

Figure 22:
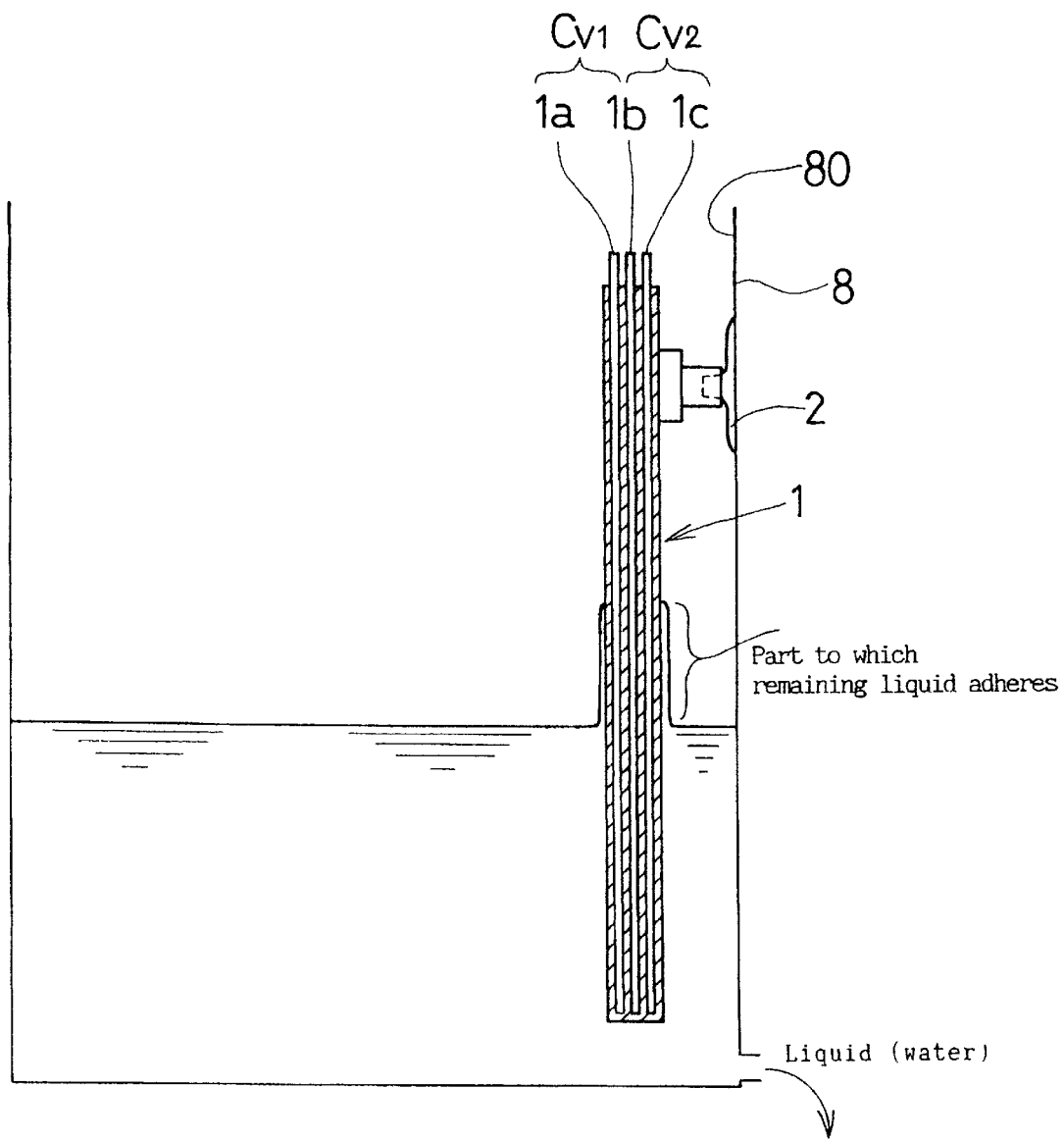
FIG. 22 is a sectional view showing a state where liquid remains on an outer surface of the sensor body when the liquid level is lowered by letting some liquid out of the container in FIG. 19.
Figure 23:
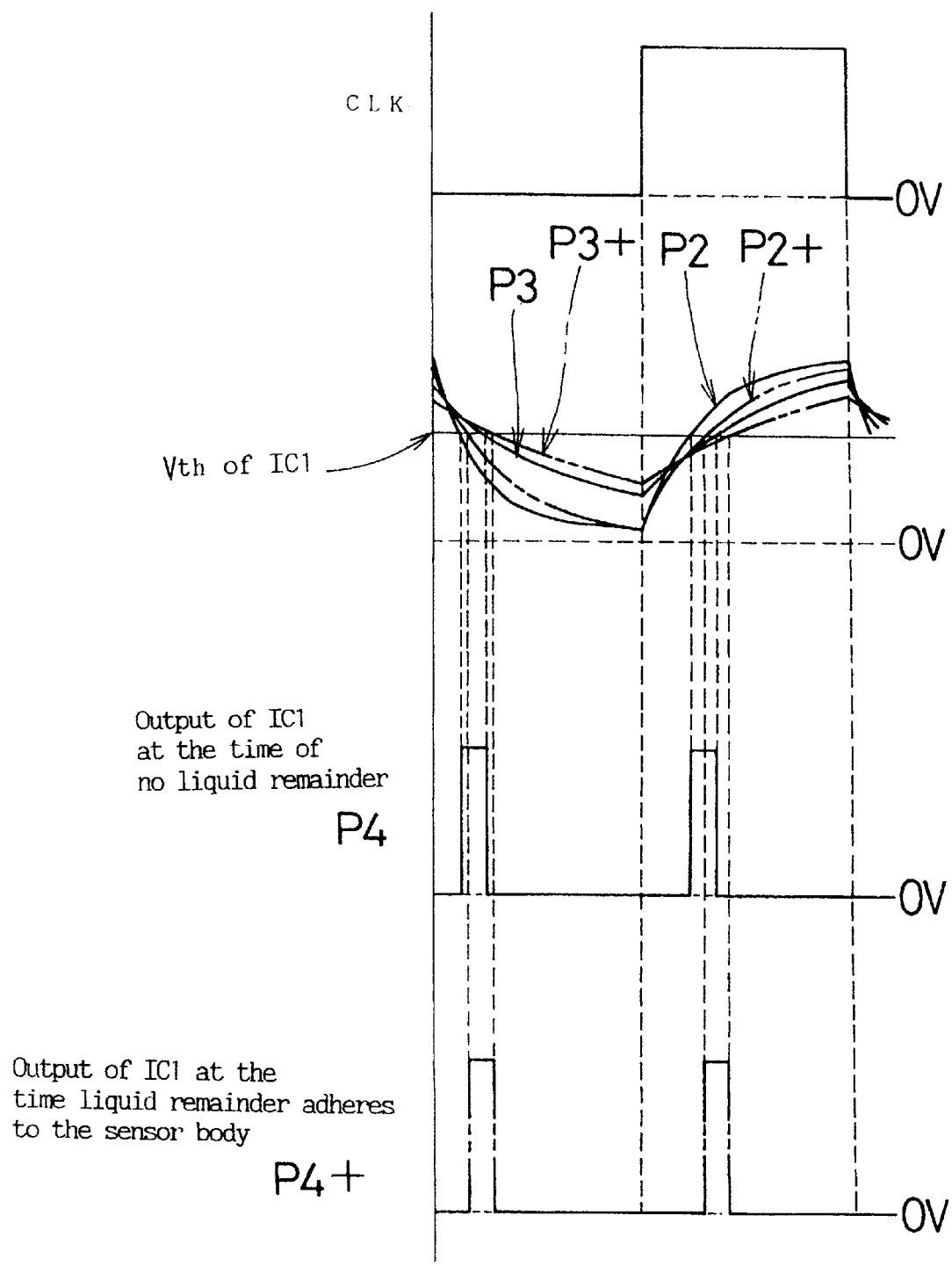
FIG. 23 is a diagram showing the relation among integration waveforms of the points P2 and P3 in FIG. 18 and an output voltage when the liquid level in FIG. 19 is lowered.

(6) This level sensor, in the sensor body 1 in FIG. 17 and the detection circuit DK in FIG. 18, can make measurements with a high accuracy even in the case of a descending level of a highly viscous liquid. In such a case, a layer of the liquid remains adhering around the sensor body 1 as shown in FIG. 22. Such adhering liquid remainder causes the total capacitances of the variable capacitors $C_{V1}$ and $C_{V2}$ of the sensor body 1 to be slightly higher than they would normally be for the actual liquid level. As a result, the integration waveforms at the points P2 and P3 appear as P2+ and P3+ in FIG. 23, which are slightly higher than the waveforms P2 and P3 without the adhering liquid.

However, since the increases in time constant are small, the dominant effect is not a change in duty ratio of the output of the EX-OR logic IC1 at the point P4, but instead produces a slight displacement in the timing of the output. (compare P4 and P4+ in FIG. 23) Therefore, the analog voltage of the output at the point 4 through the lowpass filter remains substantially unaffected by the adhering liquid. The EX-OR logic IC1 corrects the error caused by the remaining liquid adhering to the sensor body 1.

Embodiment 5

Figure 24:
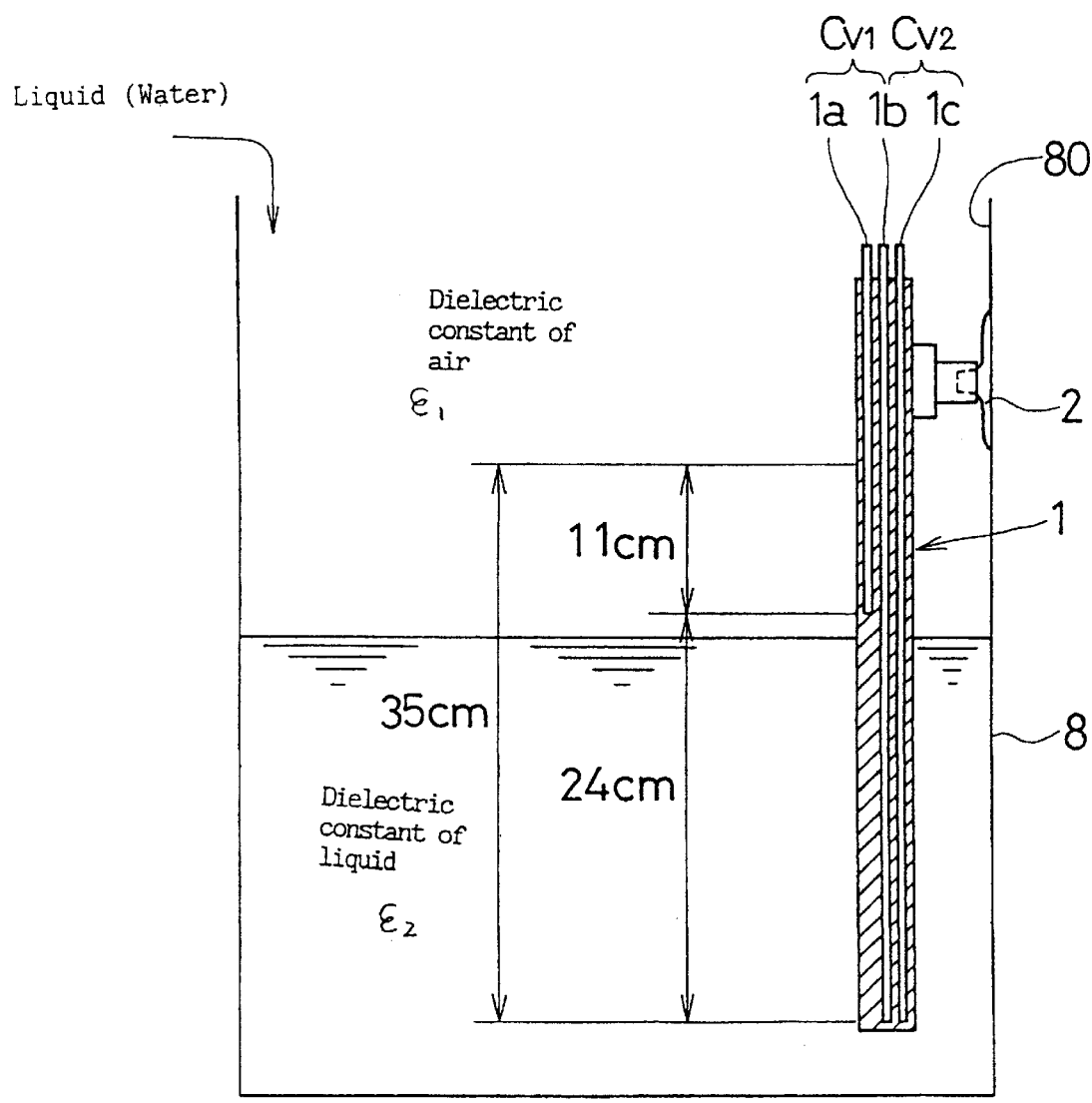
FIG. 24 is a section view of Embodiment 5 in which a sensor body is attached to a fixed wall of a container.

Referring now to FIG. 24, Embodiment 5 of a level sensor of the present invention includes electrodes 1a, 1b, and 1c. The electrode 1a is 24 cm shorter than the other electrodes 1b and 1c. The top end of electrode 1a is at the same level as the top ends of the other two electrodes, whereas the bottom end is 24 cm above the bottom ends of the others. This level sensor employs the same detection circuit DK as in Embodiment 4.

Figure 25:
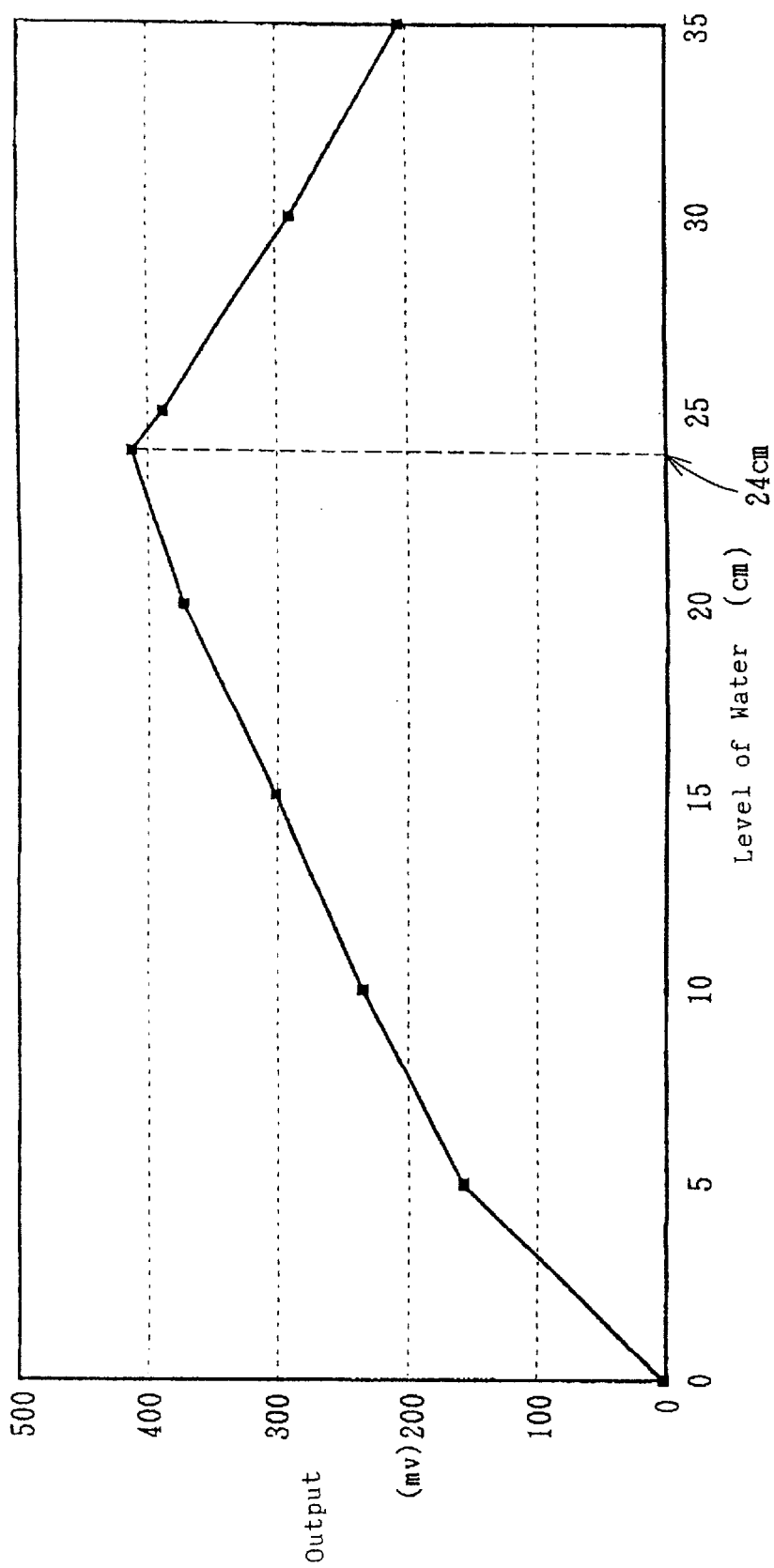
FIG. 25 is a graph showing the relation between an output and a water level in Embodiment 5.

In this level sensor, the output increases as the level of the liquid (water) rises up to the height of 24 cm as shown in FIG. 25. Then, as the water level rises further above 24 cm, the output starts descending. This type of level sensor may be efficiently used in a system set up to maintain a certain liquid level, for example by stopping the rise of liquid surface at the time when the output starts decreasing. In this graph, the liquid level of zero cm corresponds to the position of the bottoms of the electrodes 1b and 1c.

Alternatives to Embodiments 4 and 5

Figure 26:
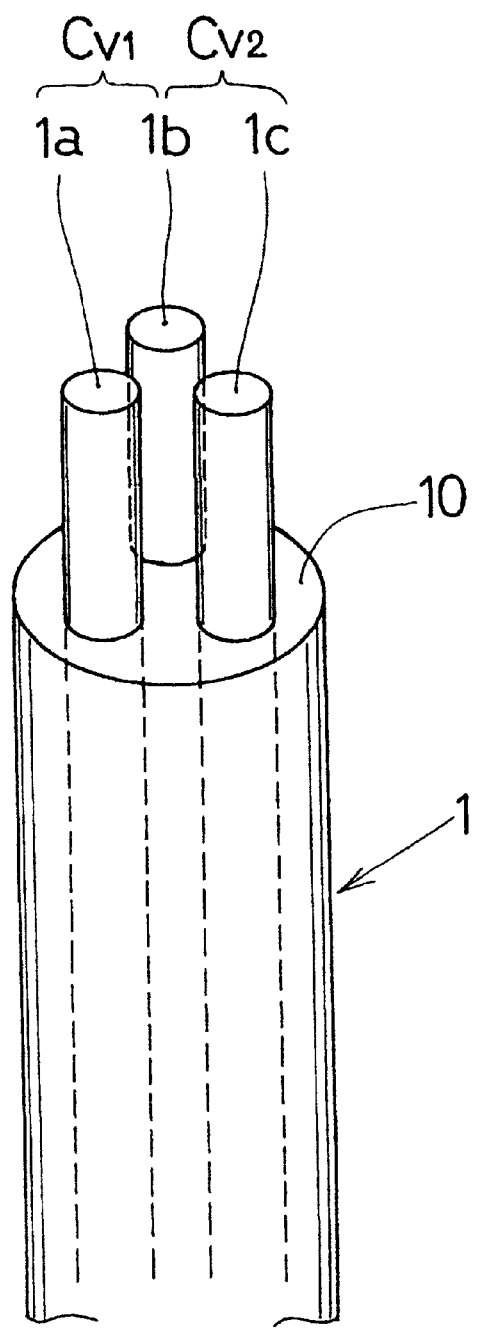
FIGS. 26 and 27 are perspective views of the essential parts of sensing bodies in other embodiments.

An alternative of the sensor body 1 is illustrated in FIG. 26. This sensor body includes electrodes (conductive wires) 1a, 1b, and 1c which are arranged mutually in parallel angularly disposed at 120-degree intervals and covered with a synthetic resin coating 10 so as to constitute two variable capacitors $C_{V1}$ and $C_{V2}$ therein.

Figure 27:
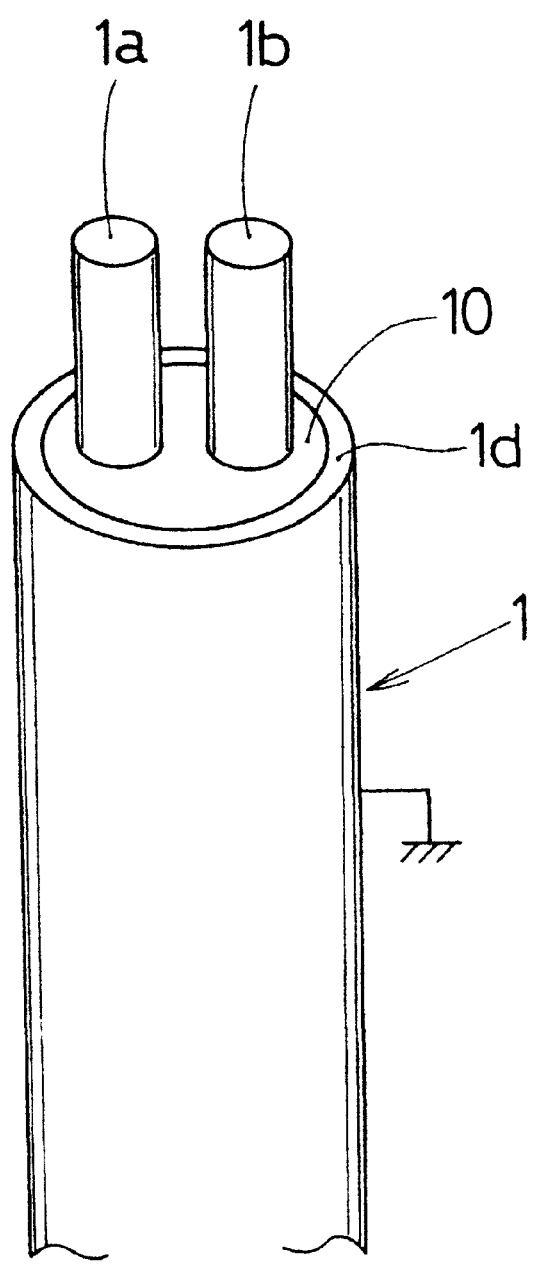

Another alternative is illustrated in FIG. 27. This sensor body includes electrodes (conductive wires) 1a and 1b with a conductive pipe 1d surrounding them. A synthetic resin filling 10 fills the space in the pipe 1d to retain electrodes 1a and 1b in place. Here, the electrodes 1a and 1b receive a voltage. The conductive pipe 1d is grounded.

The electrode 1a and the conductive pipe 1d constitute a variable capacitor and the electrode 1b and the conductive pipe 1d constitute another variable capacitor.

There may be more than three electrodes, and the electrodes may be, for example, conductive wires or bars.

Figure 28:
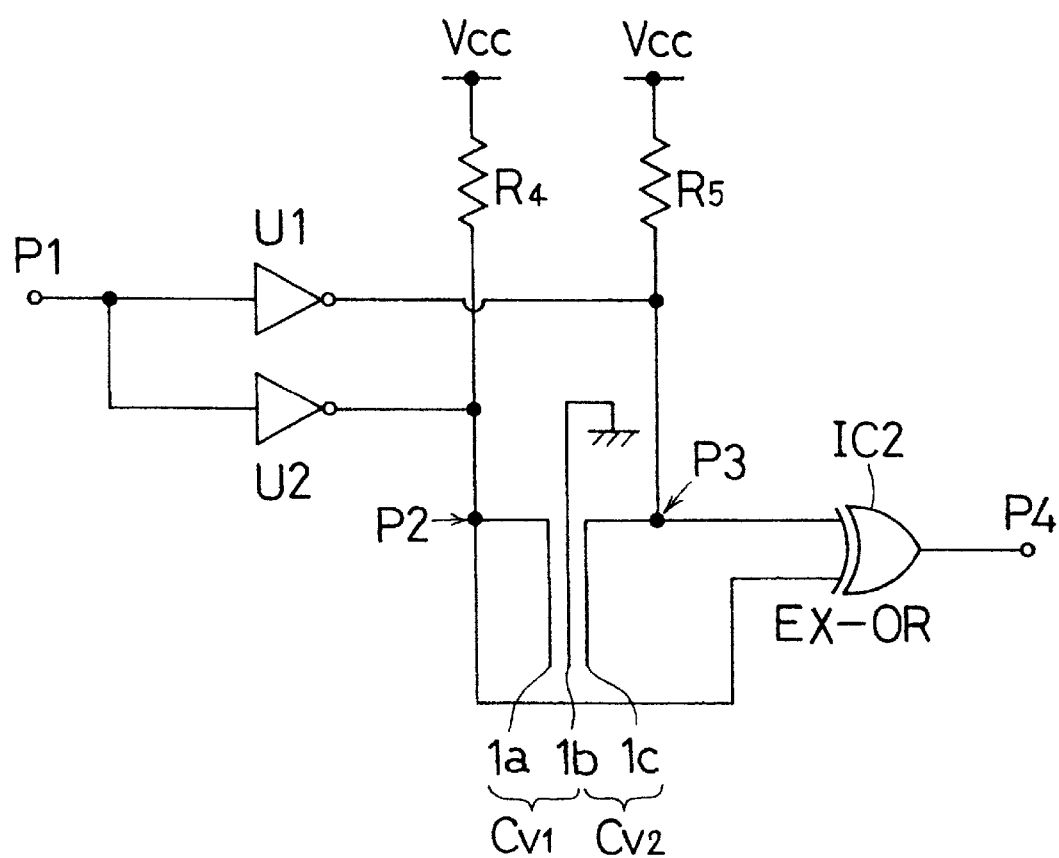
FIG. 28 is a diagram of a detection circuit of another embodiment of the present invention.

As an alternative to the detection circuit DK of Embodiment 4, a detection circuit DK in FIG. 28 may perform the same function. The drawing shows inverter IC's (open collector output) as U1 and U2, resistors as $R_4$ and $R_5$, and an EX-OR logic IC2.

Liquids, the levels of which are measured in this level sensor, include, for example, water, alcohol, petroleum, sea water, edible oil. Furthermore, particulates (i.e. powder, particles or a mixture thereof) may also be measured by this level sensor. In case of detecting the particulate level, it is desirable to use conductive bars for the electrodes, rather than conductive wires in view of the pressure of the powder.

Embodiment 6

Figure 29:
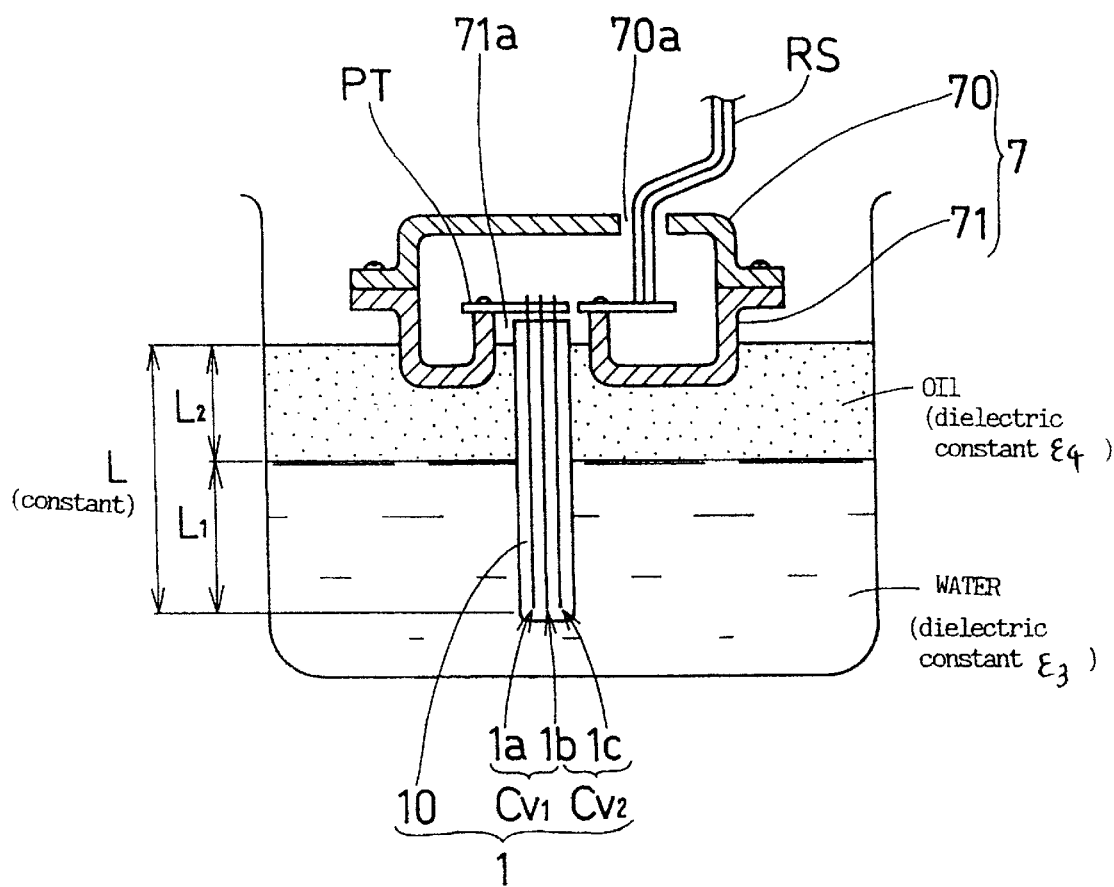
FIG. 29 is a view of the level sensor according to Embodiment 6 of the present invention.
Figure 30:
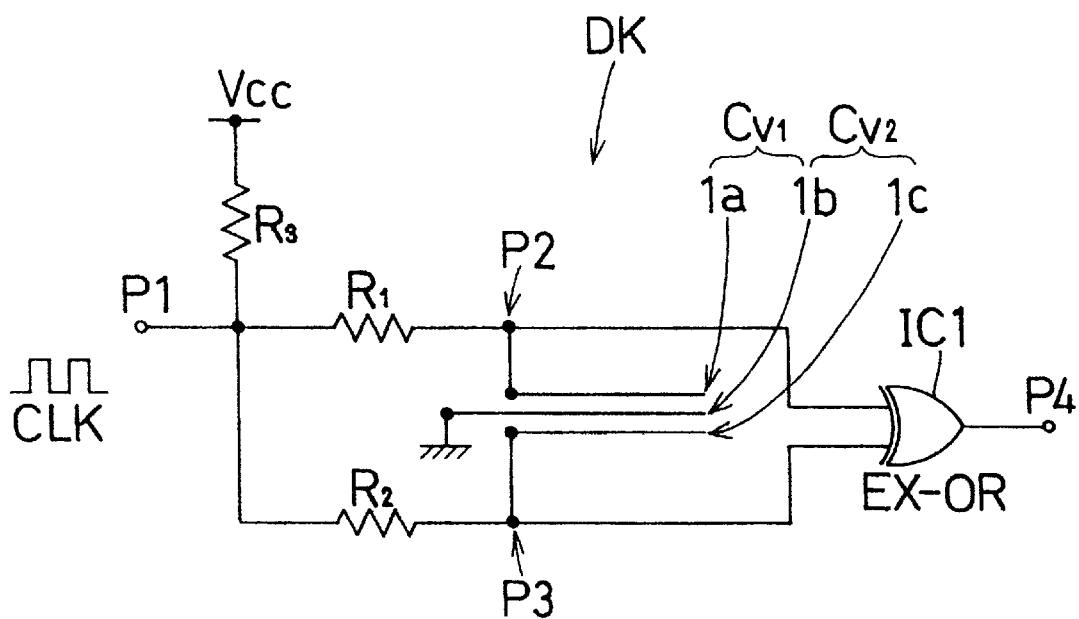
FIG. 30 is a diagram of a detection circuit of the level sensor of FIG. 29.

Referring now to FIGS. 29 and 30, Embodiment 6 of a level sensor of the present invention is designed to detect the level of the interface between an upper and a lower liquid layer (for instance, between oil and water). This level sensor includes a float 7, a sensor body 1 fixed to the float 7, and a detection circuit DK which outputs a voltage corresponding to the change in capacitance (capacitance +stray capacitance) of a variable capacitor in response to the change in the immersed length of the sensor body 1 in the upper layer liquid.

As shown in FIG. 29, the float 7 includes an upper element 70 and a lower element 71 fixed together to form a buoyant chamber capable of floating on the surface of the upper liquid. The upper element 70 has an opening 70a for a lead RS connected to an output part of a detection circuit DK. The lower element 71 has an insertion hole 71a through which the upper end of the sensor body 1 is inserted.

The sensor body 1 includes electrodes 1a, 1b, and 1c, susceptible to the surrounding stray capacitance, which are arranged mutually in parallel and covered with a synthetic resin (or rubber) coating 10 so as to form two variable capacitors $C_{V1}$ and $C_{V2}$. Electrodes 1a and 1b constitute the variable capacitor $C_{V1}$, while electrodes 1b and 1c constitute the variable capacitor $C_{V2}$.

Electrodes 1a and 1c receive voltages and the electrode 1b is connected to a ground potential.

Since the dielectric constant of oil is different from that of water, stray capacitance produced around the variable capacitors $C_{V1}$ and $C_{V2}$ depend on the thickness of the upper liquid layer, the oil layer in the example. The length of the sensor body 1 immersed in the lower liquid layer is equal to the total length of the sensor body extending below float 7, minus the thickness of the upper layer.

The terms used to denote signals are as follows:

Total capacitance produced around the whole variable capacitor $C_{V1}$: $C_{ab}$ Capacitance of the variable capacitor $C_{V1}$: $C_{ab0}$ Stray capacitance in the water surrounding the variable capacitor $C_{V1}$: $C_{ab1}$ Stray capacitance in the oil surrounding the variable capacitor $C_{V1}$: $C_{ab2}$ Total capacitance produced around the whole variable capacitor $C_{V2}$: $C_{bc}$ Capacitance of the variable capacitor $C_{V2}$: $C_{bc0}$ Stray capacitance in the water surrounding the variable capacitor $C_{V2}$: $C_{bc1}$ Stray capacitance in the oil surrounding the variable capacitor $C_{V2}$: $C_{bc2}$ Dielectric constant of the water: $\epsilon_3$ Dielectric constant of the oil: $\epsilon_4$ (with $\epsilon_3 > \epsilon_4$)

The total capacitance $C_{ab}$ produced by the electrodes 1a and 1b equals $C_{ab0}+C_{ab1}+C_{ab2}$, while the total capacitance $C_{bc}$ produced by the electrodes 1b and 1c equals $C_{bc0}+C_{bc1}+C_{bc2}$. The electrodes 1a, 1b, and 1c may be made of conductive wires or bars.

Referring now to FIG. 30, the detection circuit DK feed voltage through fixed resistors $R_1$, $R_2$, and $R_3$ (with $R_1<R_2$) to the variable capacitors $C_{V1}$ and $C_{V2}$, and an EX-OR logic IC1. The resistor $R_1$ and the variable capacitor $C_V$ constitute an integration circuit (with time constant $T_2=R_1 C_{ab}$). The resistor $R_2$ and the variable capacitor $C_{V2}$ constitute another integration circuit (with time constant $T_3=R_2 C_{bc}$). A clock CLK having a constant frequency and duty ratio is input to a point P1 in FIG. 30.

The detection circuit DK is formed on a print substrate PT shown in FIG. 29, and the sensor body 1 is provided in a downward vertical fashion from the print substrate PT.

When this level sensor is floated on the liquid surface, as shown in FIG. 29, a certain fixed length L of the sensor body 1 is always under the liquid. Therefore, when the thickness of the oil layer decreases, sensor body 1 protrudes further into the water layer. In other words, the original thicknesses of the oil and water layers being denoted as $L_1$ and $L_2$ and the subsequent thicknesses of them as $L_1'$ and $L_2'$ (not shown in the drawing), $L_1$ is smaller than $L_1'$ and $L_2$ is larger than $L_2'$ ($L_1<L_1'$, $L_2>L_2'$).

(1) This change in effective thicknesses of the water and oil layers causes a change in total capacitance of the variable capacitors $C_{V1}$ and $C_{V2}$. The changed total capacitances being denoted respectively as $C_{ab}'$ and $C_{bc}'$. Since $\epsilon_3$ is greater than $\epsilon_4$, $C_{ab}'$ and $C_{bc}'$ are smaller than $C_{ab}$ and $C_{bc}$, respectively. ($C_{ab}'<C_{ab}$ and $C_{bc}'<C_{bc}$)

(2) Due to mechanical symmetry among the electrodes 1a, 1b, and 1c, $C_{ab}$ and $C_{ab}'$ are substantially equal to $C_{bc}$ and $C_{bc}'$. ($C_{ab} \cong C_{bc}$ and $C_{ab}' \cong C_{bc}'$)

(3) The time constant at the point P2 changes to $T_2'=R_1 C_{ab}'$, and that at the point P3 changes to $T_3'=R_2 C_{bc}'$ As described above, there are relations $R_1<R_2$, $C_{ab} \cong C_{bc}$, and $C_{ab}' \cong C_{bc}'$, and the change in time constant at the point P3 becomes larger than that at the point P2 (i.e. $(T_2'-T_2)<(T_3'-T_3)$).

Figure 31:
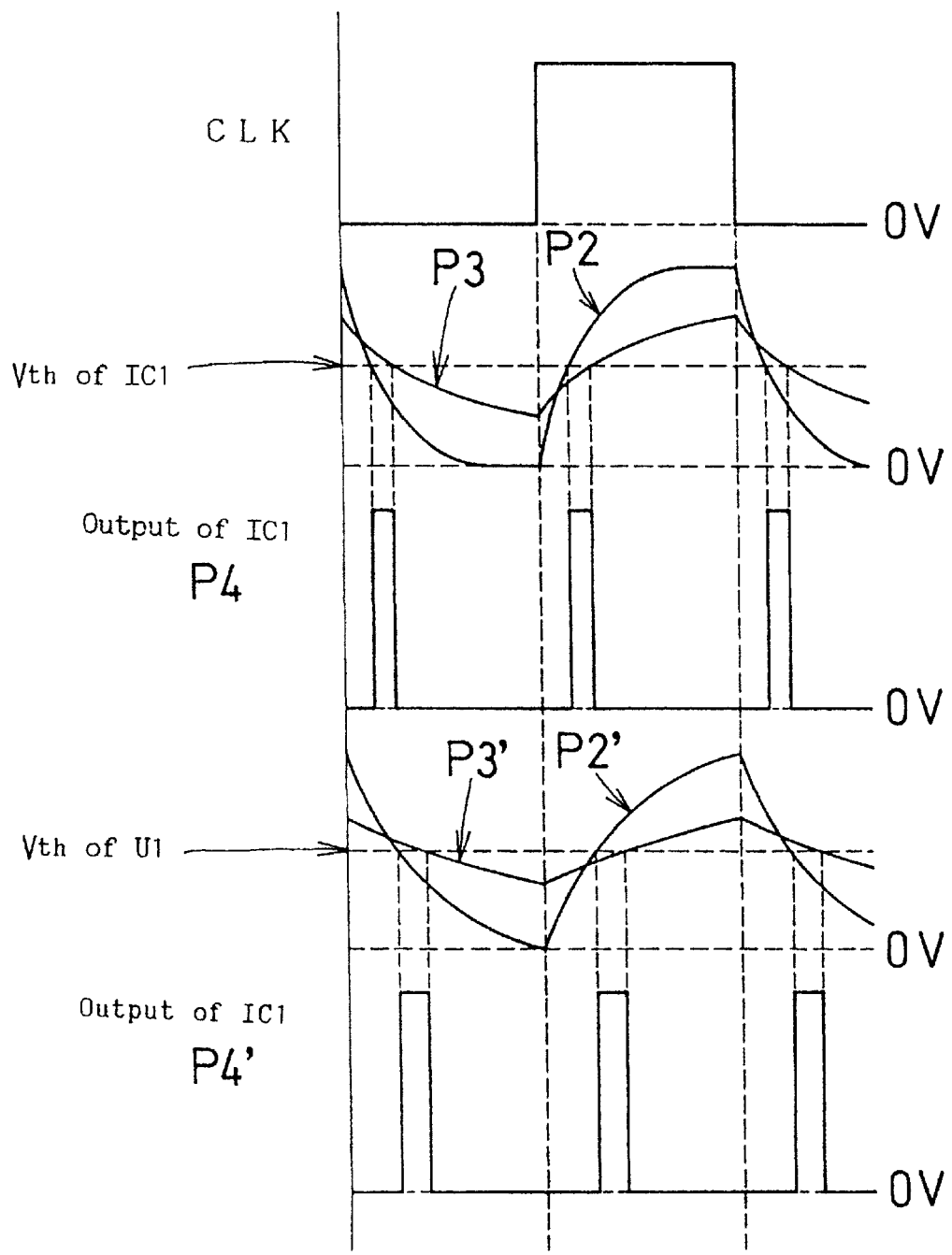
FIG. 31 is a diagram showing the relation among a clock on an input side, a clock on an output side and the like when using the detection circuit in FIG. 30.

The waveforms at points P2, P3, and P4 before the change and those after the change P2', P3', and P4' are shown in FIG. 31. As apparent from FIG. 31, the duty ratio of the output pulse at the point P4 increases with a decrease in the oil layer thickness.

(4) Therefore, the change in level of the interface between the oil and water layers wherein the dielectric constants are different can be detected as the change in duty ratio of the output pulse of the EX-OR logic IC1.

(5) Passing the output of the EX-OR logic IC1 through a low-pass filter (not shown) converts the output signal thereof to an analog voltage.

(6) In this level sensor employing the sensor body 1 in FIG. 29 and the detection circuit DK in FIG. 30, it is possible to detect the interface between the water and oil layers with a certain accuracy even when the thickness of the oil layer decreases and a bottom portion of part of the sensor body 1 which previously was submerged in the original oil layer is lowered down into the water layer. The reason for this is that, even though the respective total capacitances of the variable capacitors $C_{V1}$ and $C_{V2}$ of the sensor body 1 are slightly smaller than those within the actual oil layer, the respective integration waveforms at the points P2 and P3 have slightly smaller time constants than before. The result is merely a small phase shift in the signal at the point P4, but with negligible change in duty ratio (see FIG. 31).

Embodiment 7

Figure 32:
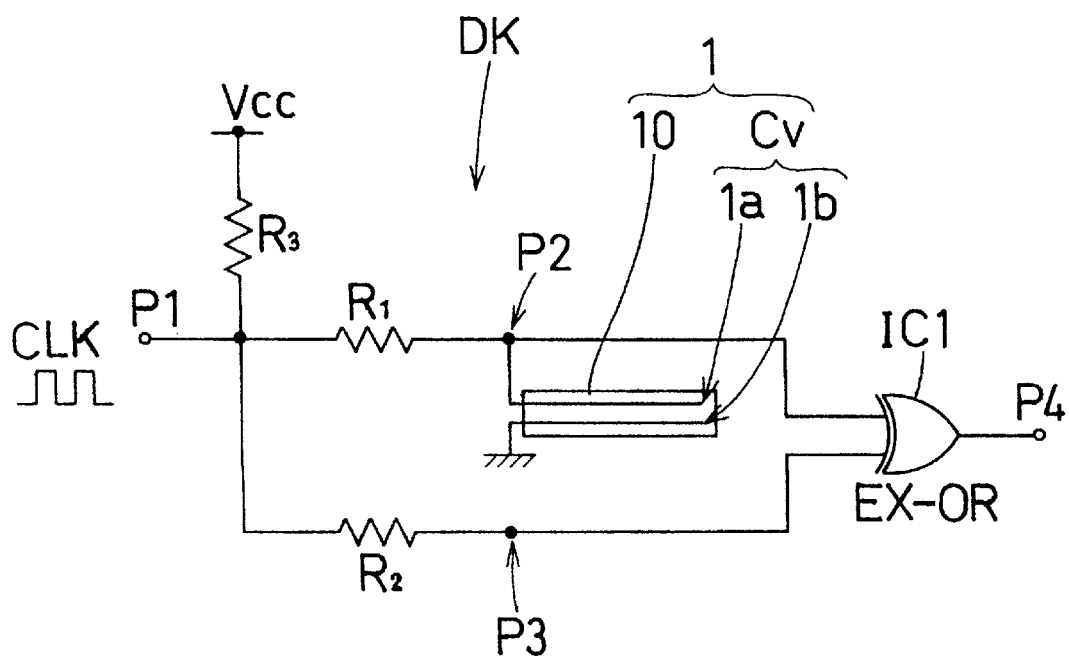
FIG. 32 is a diagram of a detection circuit of Embodiment 7 of a level sensor of the present invention.
Figure 33:
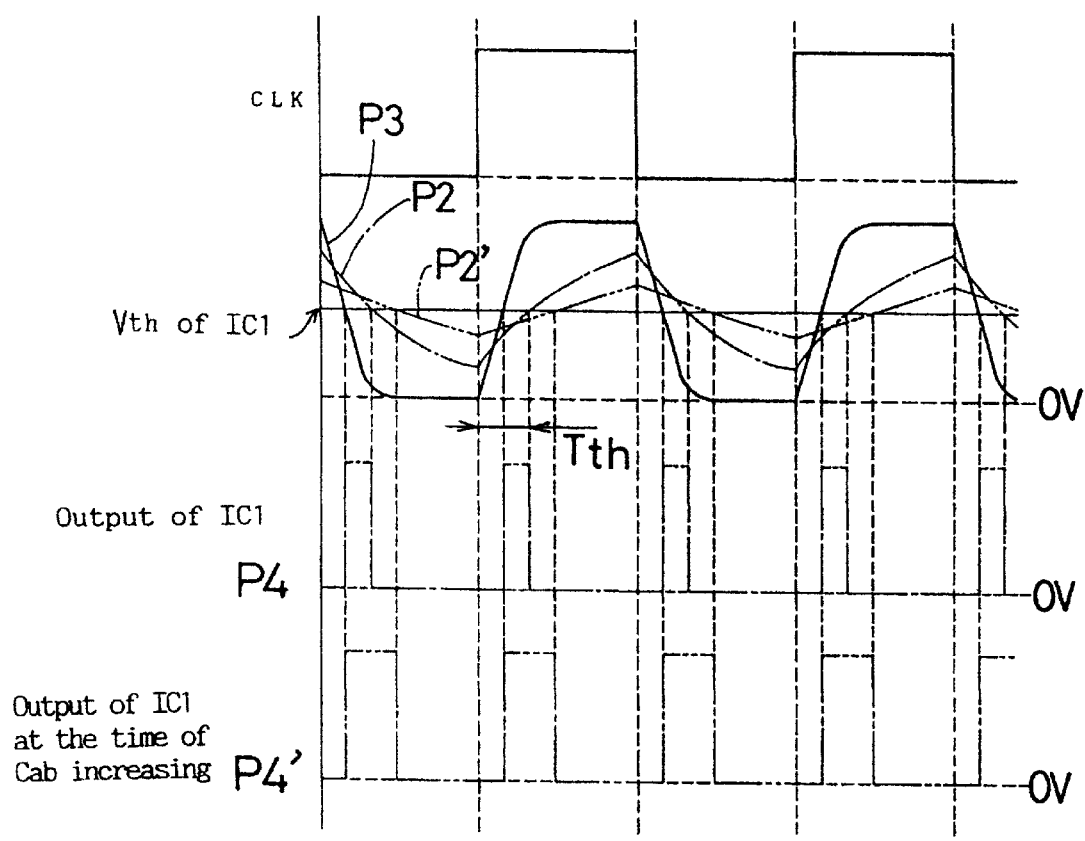
FIG. 33 is a diagram showing the relation among the input clock and various output voltages when using the detection circuit of Embodiment 7.

Referring now to FIGS. 32 and 33, Embodiment 7 of a sensor level of the present invention has basically the same structure as Embodiment 6 in which the sensor body 1 is fixed to the float through the printed circuit substrate PT. There are slight differences in the structure of the sensor body 1 and the detection circuit DK as stated below.

The sensor body 1 is provided with electrodes 1a and 1b susceptible to the surrounding stray capacitance which are arranged in parallel and covered with a synthetic resin coating 10 so as to form a variable capacitor $C_V$.

Application of a voltage to the electrode 1a and connection of the electrode 1b to a ground potential contribute to production of a capacitance in the variable capacitor $C_V$ with the electrodes 1a and 1b. However, since the dielectric constant of oil is different from that of water, the stray capacitance produced around the variable capacitor $C_V$ varies depending on the thicknesses of the oil and water layers.

The terms used to denote signals are as follows:

Total capacitance produced around the whole variable capacitor $C_V$: $C_{ab}$

Capacitance of the variable capacitor $C_V$: $C_{ab0}$

Stray capacitance around the variable capacitor $C_V$ in water: $C_{ab1}$

Stray capacitance around the variable capacitor $C_V$ in oil: $C_{ab2}$

Dielectric constant of the water: $\epsilon_3$

Dielectric constant of the oil: $\epsilon_4$ (with $\epsilon_3 > \epsilon_4$)

The total capacitance $C_{ab}$ produced by the electrodes 1a and 1b equals $C_{ab0} + C_{ab1} + C_{ab2}$. The total capacitance $C_{ab}$ is proportional to the lengths $L_1$ and $L_2$ of the electrode bars 1a and 1b. Therefore, the total capacitance varies in a known manner with the oil layer thickness.

The detection circuit DK has, as shown in FIG. 32, fixed resistors $R_1$, $R_2$, and $R_3$ (with $R_1 < R_2$), the variable capacitor $C_V$, and an EX-OR logic IC1. The resistor $R_1$ and the variable capacitor $C_V$ constitute an integration circuit (with time constant $R_1 C_{ab}$), while the resistor $R_2$ and the EX-OR logic IC1 constitute another integration circuit (with time constant equal to the input capacitance $C_{in2}$ of the EX-OR logic IC1 multiplied by $R_2$). In this detection circuit DK, the resistance chosen for the resistor $R_1$ is influenced by the input capacitance $C_{in1}$ of the EX-OR logic IC. However, since $C_{ab}$ is much larger than $C_{in1}$ ($C_{ab} >> C_{in1}$), the influence of $C_{in1}$ is here neglected.

When this level sensor is floated on the liquid surface, a certain fixed length of the sensor body 1 is always under the liquid in the same fashion as in FIG. 29. And when the thickness of the oil layer decreases, the relationship between the thicknesses of the oil and the water layer respectively change from $L_1$ and $L_2$ to $L_1'$ and $L_2'$ respectively, with $L_1 < L_1'$ and $L_2 > L_2'$.

(1) When a clock CLK is input to the point P1, according to the time constants $R_1 C_{ab}$, and $R_2 C_{in2}$, the integration waveforns at the points P2 and P3 appear as P2 and P3 in FIG. 33.

(2) As the thickness of the oil layer decreases, the total capacitance increases from $C_{ab}$ to $C_{ab}'$ because of the difference in dielectric constant of water $\epsilon_3$ and oil $\epsilon_4$ (with $\epsilon_3 > \epsilon_4$). Therefore the time constant $R_1 C_{ab}$ increases to $R_1 C_{ab}'$. Consequently, the total waveforn at the point P2 changes from P2 to P2', having a smaller inclination as shown in FIG. 33, and the threshold time $T_{th}$ from the change in clock to the accord with the threshold voltage $V_{th}$ extends. As a result, the output of the EX-OR logic IC1 at the point P4, increases from P4 to P4'. Namely, the change in the oil layer thickness corresponds to a change in duty ratio of the output of the EX-OR logic IC1.

(3) The output of the EX OR logic IC1 is sent through a low-pass filter (not shown) where it is converted to an analog voltage proportional to the duty ratio. As the oil layer thickness decreases, the output voltage increases. Although the change in the oil layer thickness is not exactly proportional to the change in duty ratio of the output of the EX-OR logic IC, from a practical standpoint, the linearity is adequate when proper circuit constants are chosen.

Embodiment 8

Figure 34:
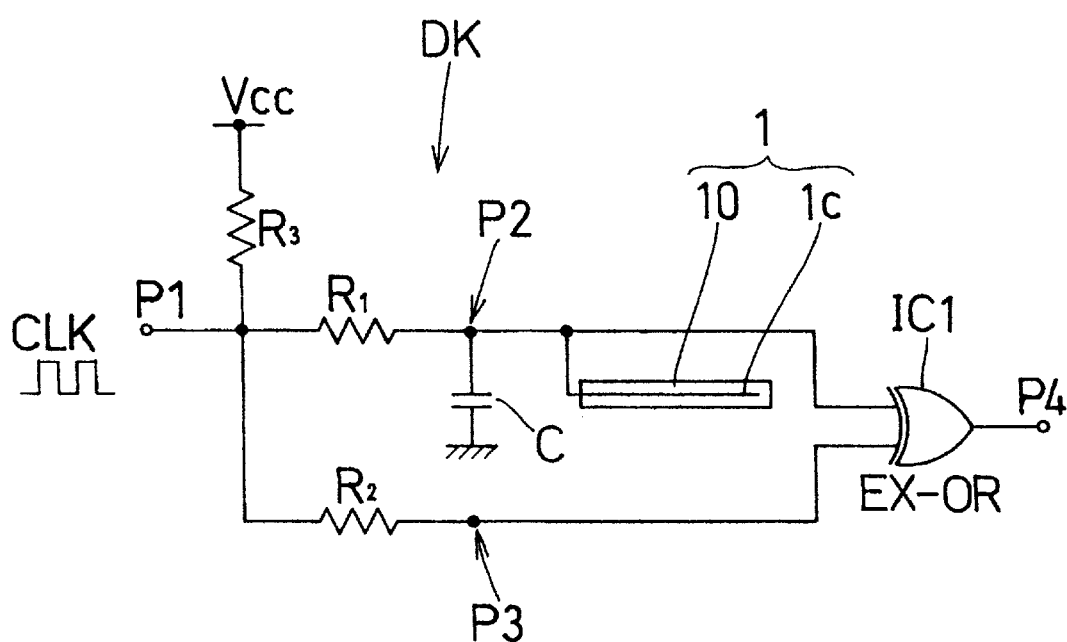
FIG. 34 is a diagram of a detection circuit of Embodiment 8 of the present invention.

Referring now to FIG. 34, Embodiment 8 of a sensor level of the present invention has basically the same structure as Embodiments 6 and 7 in which the sensor body 1 is fixed to the float through the print substrate PT. There are slight differences in the structure of the sensor body 1 and the detection circuit DK as stated below.

The sensor body 1 includes an electrode 1c which is made susceptible to the surrounding stray capacitance and covered with a synthetic resin coating 10, as shown in FIG. 34.

Due to the difference in dielectric constant between water and oil, the stray capacitance around the sensor body 1 varies depending on the thickness of the oil layer.

The terms used to denote signals are as follows:

Stray capacitance in the surroundings of the sensor body 1: $C_S$

Stray capacitance in the water surrounding the sensor body 1: $C_{s1}$

Stray capacitance in the oil surrounding the sensor body 1: $C_{s2}$

Dielectric constant of the water: $\epsilon_3$

Dielectric constant of the oil: $\epsilon_4$ (with $\epsilon_3 > \epsilon_4$)

The total capacitance $C_S$ produced by the electrode 1c is $C_{s1} + C_{s2}$. $C_{s1}$ and $C_{s2}$ are respectively proportional to the respective immersed lengths $L_1$ and $L_2$ of the electrode 1c (see. FIG. 29). Therefore, the total capacitance varies in a known manner with the thickness of the oil layer.

The detection circuit DK has, as shown in FIG. 34, fixed resistors $R_1$, $R_2$, and $R_3$ (with $R_1 < R_2$), a fixed capacitor C, the sensor body 1, and an EX-OR logic IC1. The resistor $R_1$ and the combination of the fixed capacitor C and the electrode bar 1c constitute an integration circuit. The resistor $R_2$ and the EX-OR logic IC1 constitute another integration circuit. In this detection circuit DK, the resistance value chosen for resistor $R_1$ is also influenced by an input capacitance of the EX-OR logic IC1.

However, since this input capacitance is much smaller than the capacitance of the combination of the fixed capacitor C and the electrode 1c, it is herein neglected.

This level sensor provides substantially the same function as the level sensor of Embodiment 7. That is, a clock having a constant frequency and duty ratio is input to the point P1. The output from the integration circuit having the resistor $R_1$ and the combination of the fixed capacitor C and the electrode 1c is input to the EX-OR logic IC. The duty ratio of the output of the EX-OR logic IC1 varies corresponding to the change of the capacitance (i.e. the capacitance of the fixed capacitor C plus the stray capacitance of the electrode 1c) in response to change of the immersed portion length of the electrode to in the oil layer.

Alternatives to Embodiments 6 –8

Detection circuits employed in the present invention are not limited to the ones having the above mentioned constitution as long as they provide substantially the same function.

Liquids as objects for the level sensor include any liquids having dielectric constants different from air or a second liquid such as, for example, water, alcohol, petroleum, sea water, edible oil. Any two liquids in combination may be an object in level sensing as long as those two liquids have specific gravities that cause them to separate into two separate layers, and have different dielectric constants.

Constructed as described above (but not limited to the embodiments described above), the present invention provides level sensors with which a liquid level or a particulate level can be determined continuously with high reliability, and an interface between an upper and an lower liquid layer can be detected.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A level sensor for detecting a level of an interface between an upper layer and a lower layer, said upper and lower layers having different dielectric constants comprising:
    a float;
    a capacitance type variable capacitor having two electrodes arranged mutually in parallel;
    said variable capacitor being supported by said float;
    a resistor connected to said variable capacitor to form an integration circuit;
    said variable capacitor extending downward into said upper and lower layers when said float is floated on a surface of said upper layer, whereby a capacitance of said variable capacitance is varied by an amount related to a thickness of said upper layer;
    said integration circuit receiving a clock having a constant frequency and duty ratio;
    a logic device receiving an output of said integration circuit; and
    a duty ratio of an output of said logic device varies according to change in capacitance of a capacitance plus a stray capacitance of said variable capacitor in response to change in length of a portion of said capacitor immersed in said upper layer.

2. A level sensor according to claim 1, wherein said electrodes are made of one of conductive wire and conductive bar, and said electrodes are covered with one of a synthetic resin coating and a rubber coating.

3. A level sensor according to claim 1, wherein said logic device is an EX-OR logic IC.

4. A level sensor for detecting a level of an interface between an upper liquid layer and a lower liquid layer comprising:
    a float;
    a plurality of variable capacitors having electrodes arranged mutually in parallel at equal intervals supported on said float;
    resistors connected to respective variable capacitors to form integration circuits having different time constants;
    said float being floated on a liquid surface with said plurality of variable capacitors extending downward immersing said electrodes in said two liquid layers;
    said integration circuits receiving a clock having a constant frequency and duty ratio;
    a logic device receiving an output of said integration circuit;
    a duty ratio of an output of said logic device depending on capacitances of a capacitance plus a stray capacitance of said variable capacitors in response to change in length of a portion of said capacitors immersed in said upper liquid layer.

5. A level sensor according to claim 4, wherein said electrodes are made of one of conductive wire and conductive bar, and are coated with one of a synthetic resin coating and a rubber coating.

6. A level sensor according to claim 4, wherein said logic device is an EX-OR logic IC.

7. A level sensor for detecting a level of an interface between an upper liquid layer and a lower liquid layer comprising:
    a float;
    an electrode supported on said float;
    said electrode being a variable capacitor whose capacitance varies in relation to an amount by which it is immersed in said upper and lower liquid layers;
    a resistor which, with said electrode constitutes an integration circuit;
    said electrode extending downward from said float through said upper liquid layer and partly into said lower liquid layer;
    said integration circuit receiving a clock having a constant frequency and duty ratio;
    a logic device receiving an output of said integration circuit;
    a duty ratio of an output of said logic device depending on a capacitance of a capacitance plus a stray capacitance of said variable capacitor in response to change in length of a portion of said electrode immersed in said upper layer liquid, whereby a thickness of said upper liquid layer can be determined.

8. A level sensor according to claim 7, wherein said electrode is made of one of conductive wire and conductive bar, and coated with one of a synthetic resin coating and a rubber coating.

9. A level sensor according to claim 7, wherein said logic device is an EX-OR logic IC.

* * * * *